US012719152B2

(12) United States Patent
Yamagata et al.

(10) Patent No.: US 12,719,152 B2
(45) Date of Patent: Aug. 25, 2026

(54) IMAGE PICKUP APPARATUS WITH WIRELESS ANTENNA

(71) Applicant: CANON KABUSHIKI KAISHA, Tokyo (JP)

(72) Inventors: Kenji Yamagata, Kanagawa (JP); Yuko Teruya, Kanagawa (JP); Yuta Nakamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 19/045,758

(22) Filed: Feb. 5, 2025

(65) Prior Publication Data

US 2025/0266607 A1 Aug. 21, 2025

(30) Foreign Application Priority Data

Feb. 15, 2024 (JP) ................................ 2024-021149

(51) Int. Cl.

| | |
|---|---|
| ***H01Q 1/22*** | (2006.01) |
| ***H01Q 1/00*** | (2006.01) |
| ***H01Q 1/42*** | (2006.01) |
| ***H01Q 9/04*** | (2006.01) |
| ***H04N 5/77*** | (2006.01) |
| ***H04N 23/51*** | (2023.01) |

(52) U.S. Cl.

CPC ............... *H01Q 1/22* (2013.01); *H01Q 1/002* (2013.01); *H01Q 1/42* (2013.01); *H01Q 9/0407* (2013.01); *H04N 5/772* (2013.01); *H04N 23/51* (2023.01)

(58) Field of Classification Search

CPC ........... H01Q 1/22; H01Q 1/002; H01Q 1/42; H01Q 9/0407; H01Q 1/02; H01Q 1/24; H01Q 1/273; H01Q 1/528; H01Q 9/42; H04N 5/772; H04N 23/51

See application file for complete search history.

(56) References Cited

U.S. PATENT DOCUMENTS

| | | | | |
|---|---|---|---|---|
| 2019/0335075 | A1* | 10/2019 | Ueda | H01Q 1/22 |
| 2020/0084347 | A1* | 3/2020 | Kimura | G03B 17/02 |
| 2022/0272236 | A1* | 8/2022 | Yamagata | H04N 23/57 |

FOREIGN PATENT DOCUMENTS

| | | |
|---|---|---|
| JP | 6520509 B2 | 5/2019 |

* cited by examiner

*Primary Examiner* — David E Lotter

(74) *Attorney, Agent, or Firm* — Cowan, Liebowitz & Latman, P.C.

(57) ABSTRACT

Image pickup apparatuses capable of ensuring sufficient wireless performance while suppressing an increase in size of the image pickup apparatuses, are provided. An image pickup apparatus includes a rectangular wireless antenna with an antenna pattern in a planar shape, a housing having a substantially hexahedral shape and including a conductive member, and a wireless cover that forms a part of a ridge extending between a rear surface and an upper surface of the housing. The wireless cover is formed of a non-conductive member. The wireless antenna is arranged inside the image pickup apparatus while facing the wireless cover at a predetermined angle with respect to the housing around an axis extending in a width direction of the image pickup apparatus.

12 Claims, 27 Drawing Sheets

500
510
521
520
530
541
543
540
544
570
550
560
580
582
590
600
610
110
X
Y
Z

IMAGE PICKUP APPARATUS WITH WIRELESS ANTENNA

BACKGROUND OF THE INVENTION

Field of the Invention

The present invention relates to image pickup apparatuses, such as cameras and video cameras, that are equipped with wireless antennas.

Description of the Related Art

An increasing number of image pickup apparatus models are equipped with wireless capabilities in order to allow users to operate the image pickup apparatuses remotely or to transfer picked up image data. An image pickup apparatus with wireless capabilities is typically equipped with a wireless antenna, communication circuit, and the like for sending and receiving wireless signals. In electronic devices such as image pickup apparatuses, in order to improve the strength of their housings, an exterior member is often made of a high-rigidity material such as a resin mixed with a metal, a conductive filler, or the like.

When a wireless antenna is provided inside such an image pickup apparatus, wireless performance may deteriorate because of the influence of conductive members surrounding the wireless antenna, and there is room for improvement in obtaining desired wireless communication characteristics. To improve this point, Japanese Patent No. 6520509 discloses a technique of arranging an antenna around which an exterior member is open in three directions.

According to the disclosed technique, for the purpose of making the exterior member around the antenna open in three directions, a convex part is protruded from an image pickup apparatus and a wireless antenna is arranged as the antenna inside the convex part. This can result in increased size of the image pickup apparatus.

SUMMARY OF THE INVENTION

The present invention provides image pickup apparatuses capable of ensuring desired wireless performance while suppressing an increase in size of the image pickup apparatuses.

According to an aspect of the invention, an image pickup apparatus includes a wireless antenna in a rectangular shape, extending in the width direction of the image pickup apparatus, the wireless antenna including an antenna pattern in a planar shape; a housing in a substantially hexahedral shape, including a conductive member; and a wireless cover that forms a part of a ridge extending between a rear surface and an upper surface of the housing. The wireless cover is formed of a non-conductive member. The wireless antenna is arranged inside the image pickup apparatus, facing the wireless cover at a predetermined angle with respect to the housing around an axis extending in the width direction of the image pickup apparatus.

According to the present invention, it is possible to obtain an effect of making it possible to ensure desired wireless performance while suppressing an increase in size of an image pickup apparatus.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
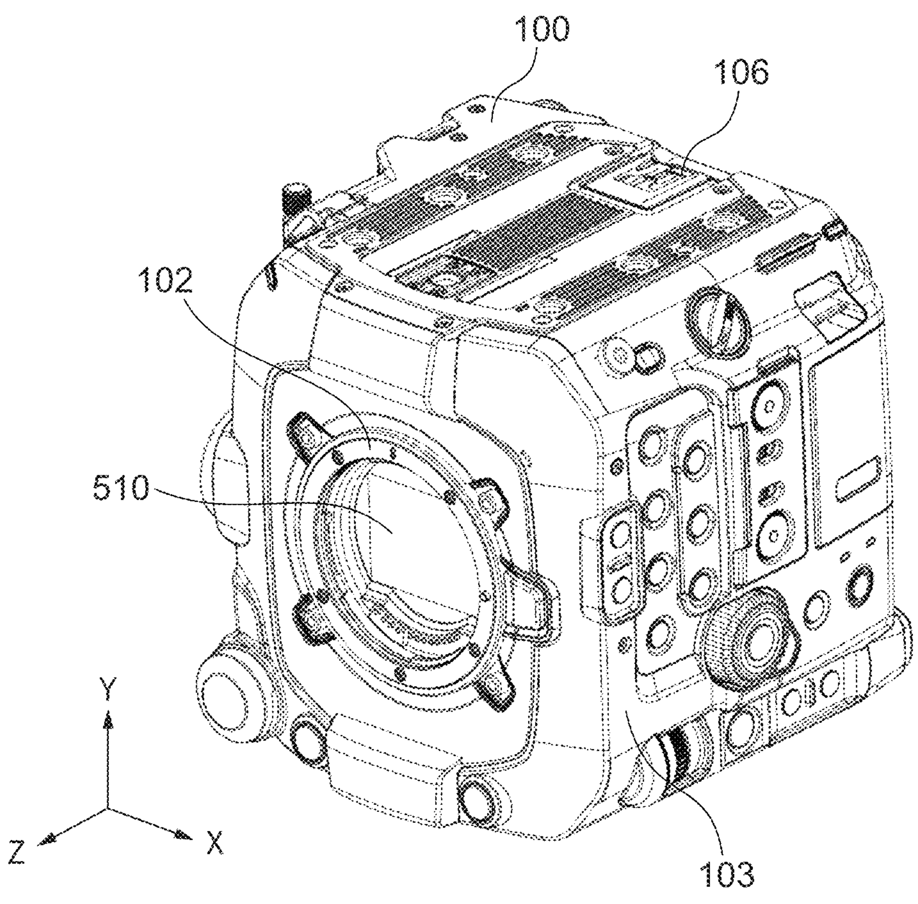
FIG. 1 is an external perspective view of an image pickup apparatus 100 as viewed from a front upper side.

First, a configuration of an image pickup apparatus 100 will be described with reference to FIGS. 1 and 2. FIG. 1 is an external perspective view of the image pickup apparatus 100 of the present embodiment as viewed from a front upper side, and FIG. 2 is an external perspective view of the image pickup apparatus 100 of the present embodiment as viewed from a rear upper side.

Figure 2:
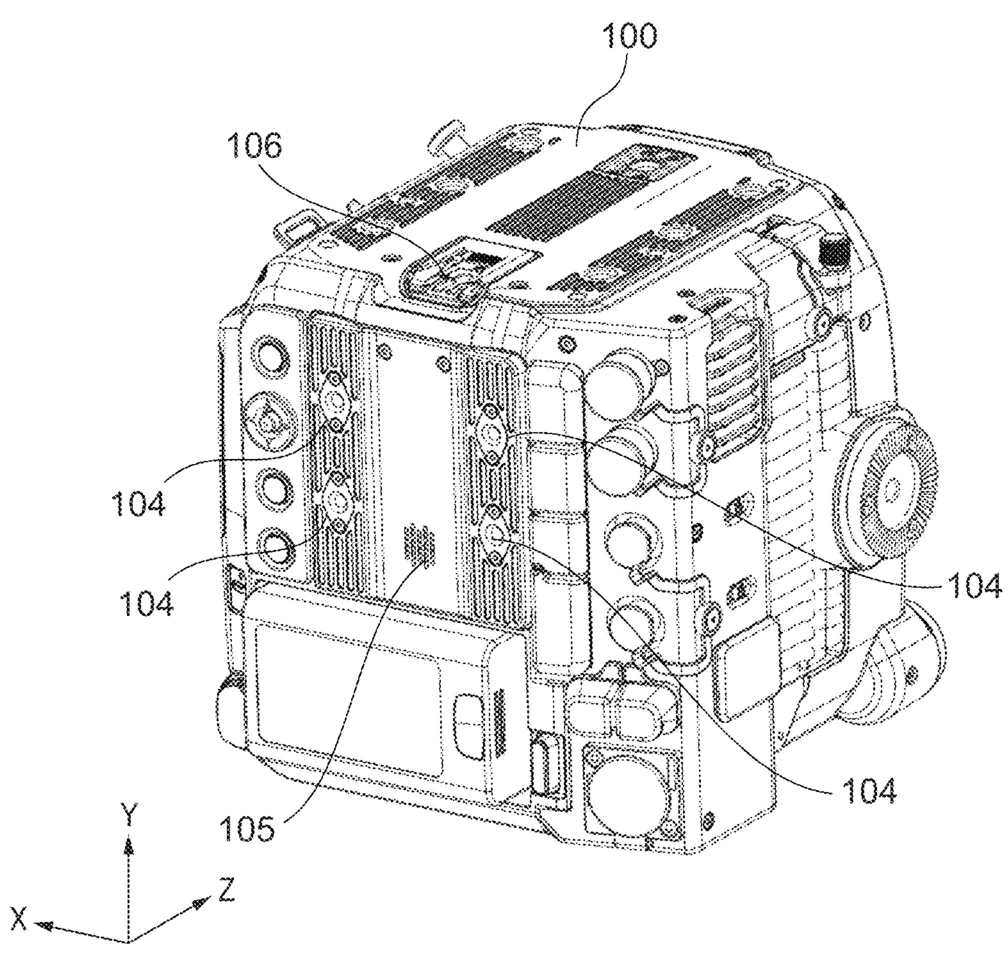
FIG. 2 is an external perspective view of the image pickup apparatus 100 as viewed from a rear upper side.

To clarify the configuration of the image pickup apparatus 100, coordinate axes (XYZ) orthogonal to each other as illustrated in FIGS. 1 and 2 are used. The "Z axis" indicates a front-rear direction of the image pickup apparatus 100, which is an optical axis direction perpendicular to an imaging surface (front surface) of an image pickup element 510. The direction from the rear surface side to the front surface side of the image pickup apparatus 100 is defined as a positive direction of the Z axis. The "Y axis" indicates an up-down direction of the image pickup apparatus 100. The direction from the lower surface side toward the upper surface side of the image pickup apparatus 100 is defined as a positive direction of the Y axis. The "X axis" indicates a left-right direction of the image pickup apparatus 100. The direction from the left side surface toward the right side surface of the image pickup apparatus 100 as viewed from the front is defined as a positive direction of the X axis. The "X axis" can also be understood to indicate a "width direction" of the image pickup apparatus 100. Thus, a direction around the X axis can be regarded as "a direction around the axis extending in a width direction of the image pickup apparatus 100". Hereinafter, the description will be appropriately made with reference to the directions of the X, Y, and Z axes defined as described above.

As illustrated in FIGS. 1 and 2, the image pickup apparatus 100 includes a lens mounting part 102 exposed at the front surface of the image pickup apparatus 100, and an image pickup element 510 fixed at a position behind a lens mounted on the lens mounting part 102 as viewed from the front. The image pickup element 510 is configured to generate image data based on an optical image formed thereon by an optical system such as a lens. The lens mounting part 102 is configured such that any of a plurality of types of lenses having different optical characteristics is mountable thereon and dismountable therefrom. Light incident on one or more lenses mounted on the lens mounting part 102 forms an image on the imaging surface of the image pickup element 510.

Operation members such as various buttons are provided on a right side surface 103 (+X side surface) of the image pickup apparatus 100, which allows users operating the operation members to perform various operations such as switching the power of the image pickup apparatus 100 ON/OFF, image pickup, and audio adjustment. A housing formed of an exterior member of the image pickup apparatus 100 is basically composed of one or more conductive members.

As illustrated in FIG. 2, on the rear surface of the image pickup apparatus 100, four general-purpose accessory attachment parts 104 to which a general-purpose accessory or accessories can be attached and a speaker 105 for emitting sound are provided. These will be described later.

The upper surface of the image pickup apparatus 100 is flat, and the upper surface is provided with an accessory attachment electrical contact 106 to which an accessory can be attached. The accessory attachment electrical contact 106 is a member having a "U" shape in plan view, in which a main member is made of metal, and includes an electrical contact part for an external accessory. The accessory attachment electrical contact 106 is configured to perform communication of various signals for performing communication and control between the image pickup apparatus 100 and an external accessory. The accessory attachment electrical contact 106 is capable of firmly holding an external accessory.

It should be noted that the image pickup apparatus 100 further includes various components used for storing moving images. However, since the components and the functional details thereof are not related to the essence of the present embodiment, the description thereof will be omitted.

Figure 3:
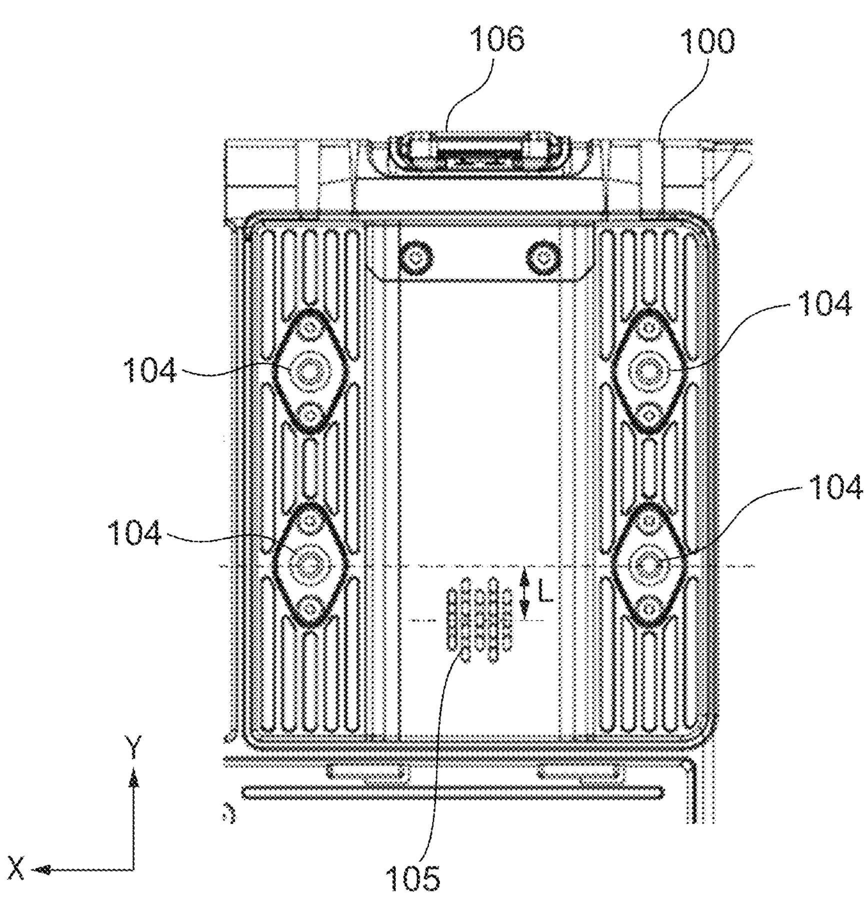
FIG. 3 is a rear view of the image pickup apparatus 100.

Next, the rear surface of the image pickup apparatus 100 will be described with reference to FIG. 3. FIG. 3 is a rear view of the image pickup apparatus 100. As illustrated in FIGS. 2 and 3, the general-purpose accessory attachment parts 104 to which a general-purpose accessory or accessories can be attached and the speaker 105 are provided on the rear surface of the image pickup apparatus 100, as described above. The general-purpose accessory attachment part 104 includes a female screw capable of fastening a male screw of M4 (screw thread size according to the Japanese Industrial Standards or JIS metric screw thread standard), and a plurality of (four in this example) general-purpose accessory attachment parts 104 is provided on the rear surface of the image pickup apparatus 100. With this structure, a user is allowed to attach a plurality of accessories freely to the image pickup apparatus 100 or firmly fix a heavy and large accessory to the image pickup apparatus 100 using a plurality of screws.

Since it is preferable to fix a general-purpose accessory at a position that does not affect image pickup or operation of various buttons, the general-purpose accessory attachment parts 104 are provided on the rear surface of the image pickup apparatus 100. Since the speaker 105 is used when a user (person who picks up images) checks the sound of a stored image, the speaker 105 is preferably provided on the user side, that is, on the rear surface of the image pickup apparatus 100, from the viewpoint of usability.

Figure 4:
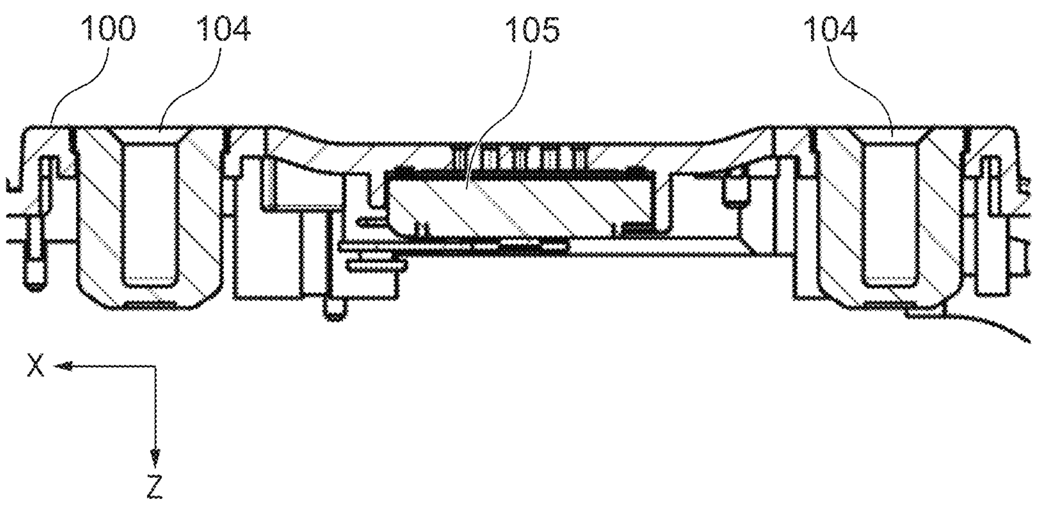
FIG. 4 is a sectional view of a part including the speaker 105 of the image pickup apparatus 100.

FIG. 4 is a transverse sectional view of a part including the speaker 105 of the image pickup apparatus 100. As illustrated in FIGS. 3 and 4, the speaker 105 is arranged while being sandwiched between a pair of left and right general-purpose accessory attachment parts 104 on the lower side (−Y side) of the four general-purpose accessory attachment parts 104. As illustrated in FIG. 3, the speaker 105 is located below (lower by an amount corresponding to a distance L from) a straight line extending in the horizontal direction, the straight line connecting both centers of the pair of left and right general-purpose accessory attachment parts 104 on the lower side. The distance L is set sufficiently large, so that a general-purpose accessory does not cover the entire surface of the speaker 105 even when the general-purpose accessory is attached to the general-purpose accessory attachment part 104. That is, at least a part of the sound emission region of the speaker 105 is exposed below the general-purpose accessory. This allows a user to satisfactorily listen to the sound emitted from the speaker 105.

Figure 5:
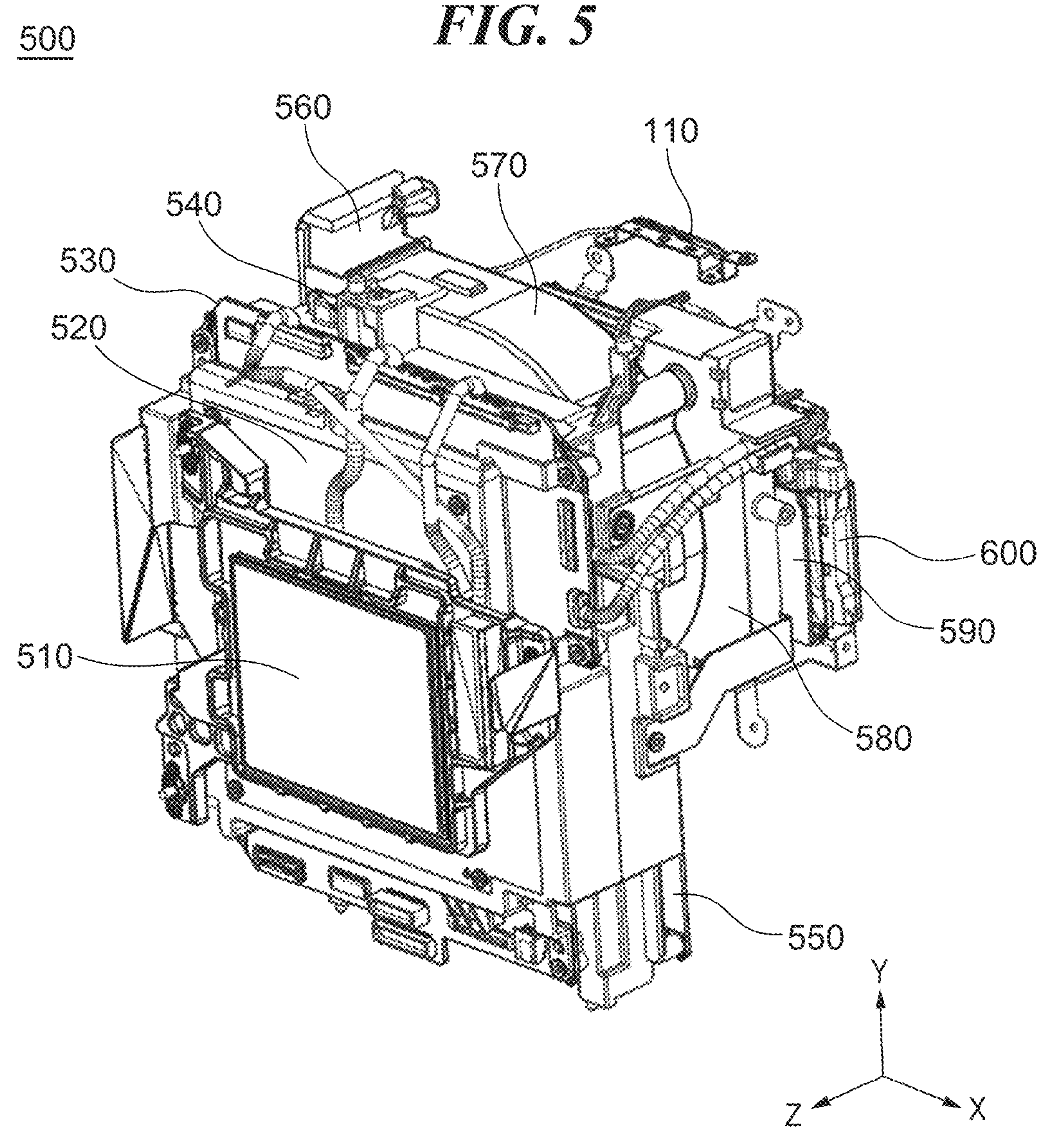
FIG. 5 is a perspective view of an internal structure 500 as viewed from the front.
Figure 6:
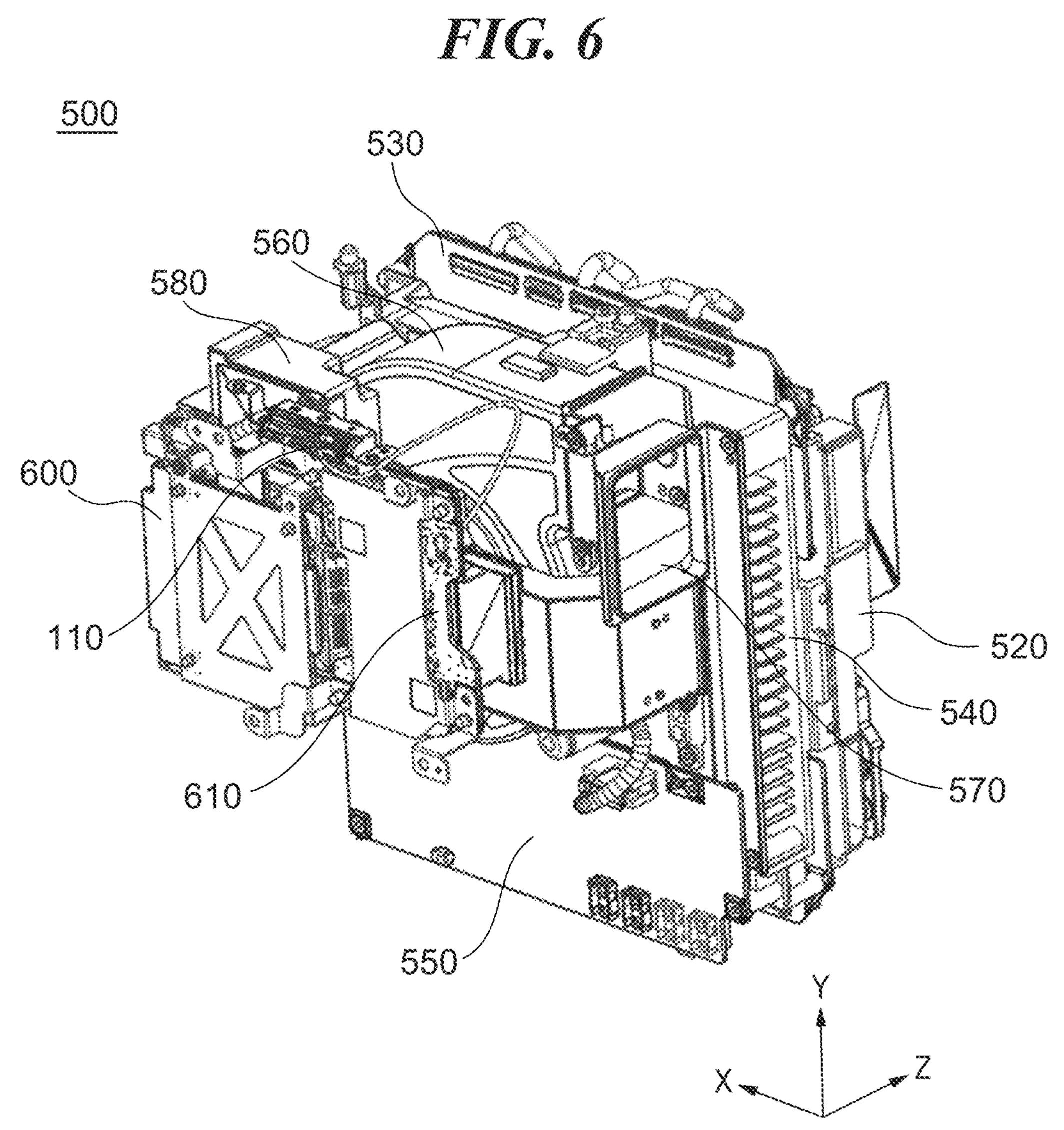
FIG. 6 is a perspective view of an internal structure 500 as viewed from the rear.

Next, an internal structure 500 of the image pickup apparatus 100 will be described with reference to FIGS. 5 to 8. FIG. 5 is a perspective view of the internal structure 500 as viewed from the front, FIG. 6 is a perspective view of the internal structure 500 as viewed from the rear, FIG. 7 is an exploded perspective view of the internal structure 500 as viewed from the front, and FIG. 8 is an exploded perspective view of the internal structure 500 as viewed from the rear.

Figure 7:
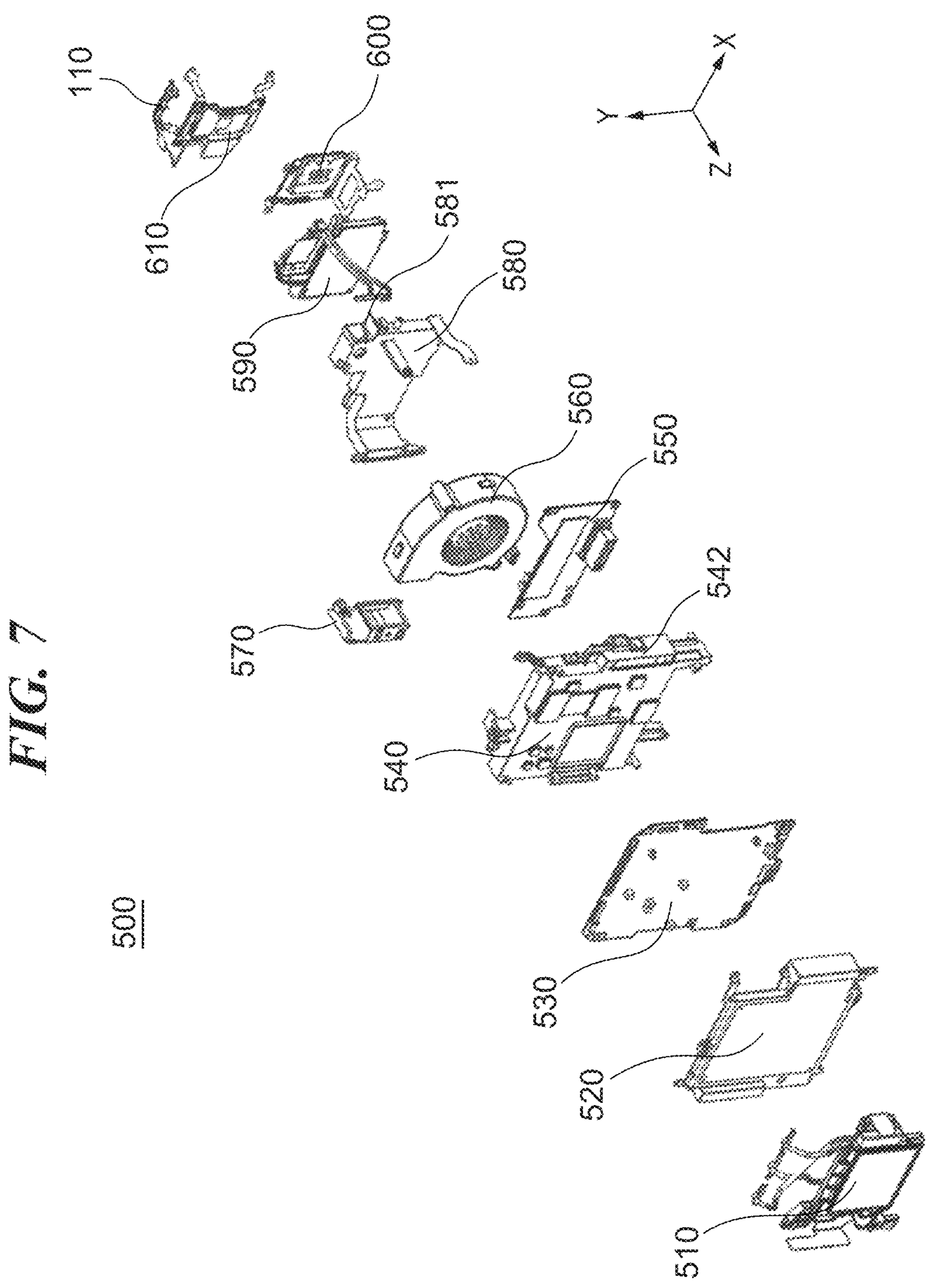
FIG. 7 is an exploded perspective view of the internal structure 500 as viewed from the front.
Figure 8:
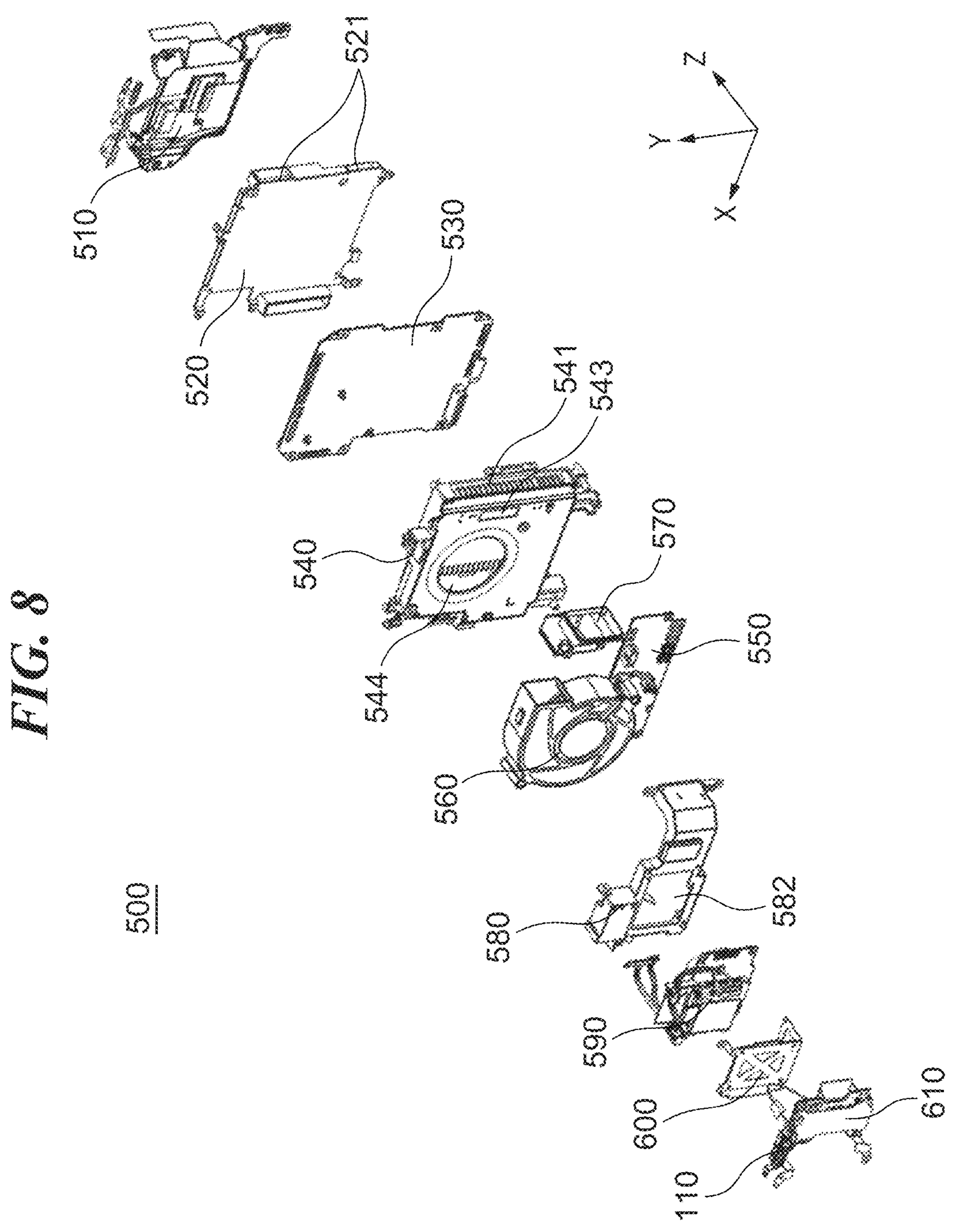
FIG. 8 is an exploded perspective view of the internal structure 500 as viewed from the rear.

As illustrated in FIG. 7, the image pickup apparatus 100 internally includes the image pickup element 510, a sensor duct unit 520, a control circuit board 530, a main duct unit 540, and a power supply board 550, which are arranged in the optical axis direction (+Z direction) in order from the front and are substantially parallel to each other. Further, the image pickup apparatus 100 internally includes a blower 560, an exhaust duct unit 570, a media duct unit 580, a media board 590, a sub-media board 600, and a wireless board 610, which are arranged in the optical axis direction in order from the front and are substantially parallel to each other. A wireless antenna 110 is arranged in the upper (+Y side) rear (−Z side) side in the image pickup apparatus 100. The arrangement position of the wireless antenna 110 will be described later.

The main components of the internal structure 500 will be described. The image pickup element 510 is configured to convert light incident on the imaging surface from a lens (which is not illustrated) into an electric signal. The control circuit board 530 is a board on which a plurality of integrated circuits (ICs) that controls the entire image pickup apparatus 100 are mounted, and occupies the largest area inside the image pickup apparatus 100. On the control circuit board 530, an IC for performing image processing on an electric signal (image signal) from the image pickup element 510, an IC for performing color adjustment of an image, and a memory used when various types of processing are executed by these ICs are mounted. The ICs mounted on the control circuit board 530 include, for example, a CPU, a RAM, and a ROM. The CPU is configured to execute various types of control and processing by loading programs stored in the ROM into the RAM and then executes the programs. The power supply board 550 is mounted with a power supply part that supplies power to electric devices in the image pickup apparatus 100 which include the control circuit board 530.

The media board 590 is a board on which a recording medium that records image information is mounted. The recording medium is a smart card, a USB memory, or the like. The recording medium is dismountable by a user from the media board 590. On the sub-media board 600, a storage device is mounted to store setting information at the time of image pickup performed by a user and store backup images. This storage device has a capacity smaller than the data capacity of a main image to be recorded on the recording medium mounted on the media board 590. Examples of the storage device include a flash memory. The wireless board 610, on which a wireless control IC for controlling the wireless antenna 110 is mounted, is electrically connected to the wireless antenna 110 via a wire 112 which will be described later. The wireless antenna 110 is configured to perform wireless communication with an external device.

Next, a forced air cooling system of the image pickup apparatus 100 will be described with reference to FIGS. 9, 10A, and 10B.

Figure 9:
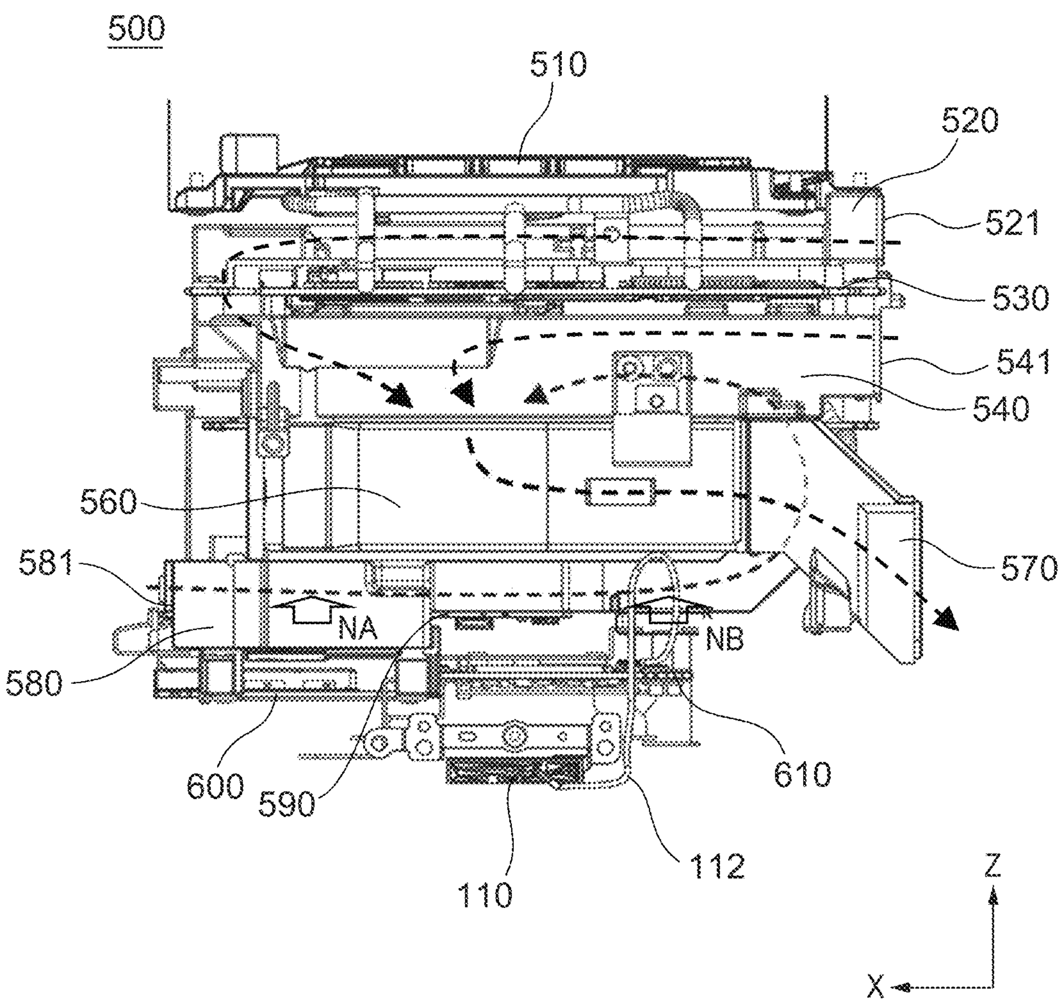
FIG. 9 is a top view of the internal structure 500.
Figure 10A:
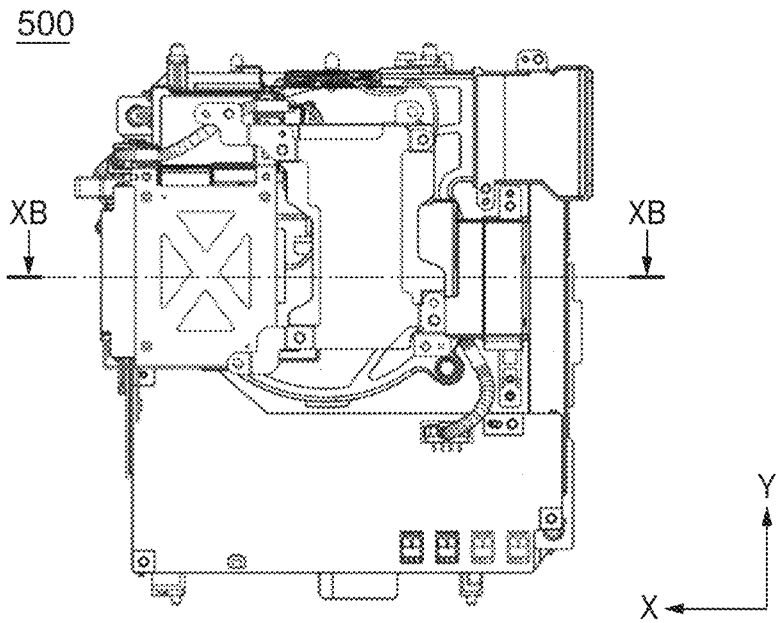
FIGS. 10A and 10B are a rear view and a sectional view of the internal structure 500.
Figure 10B:
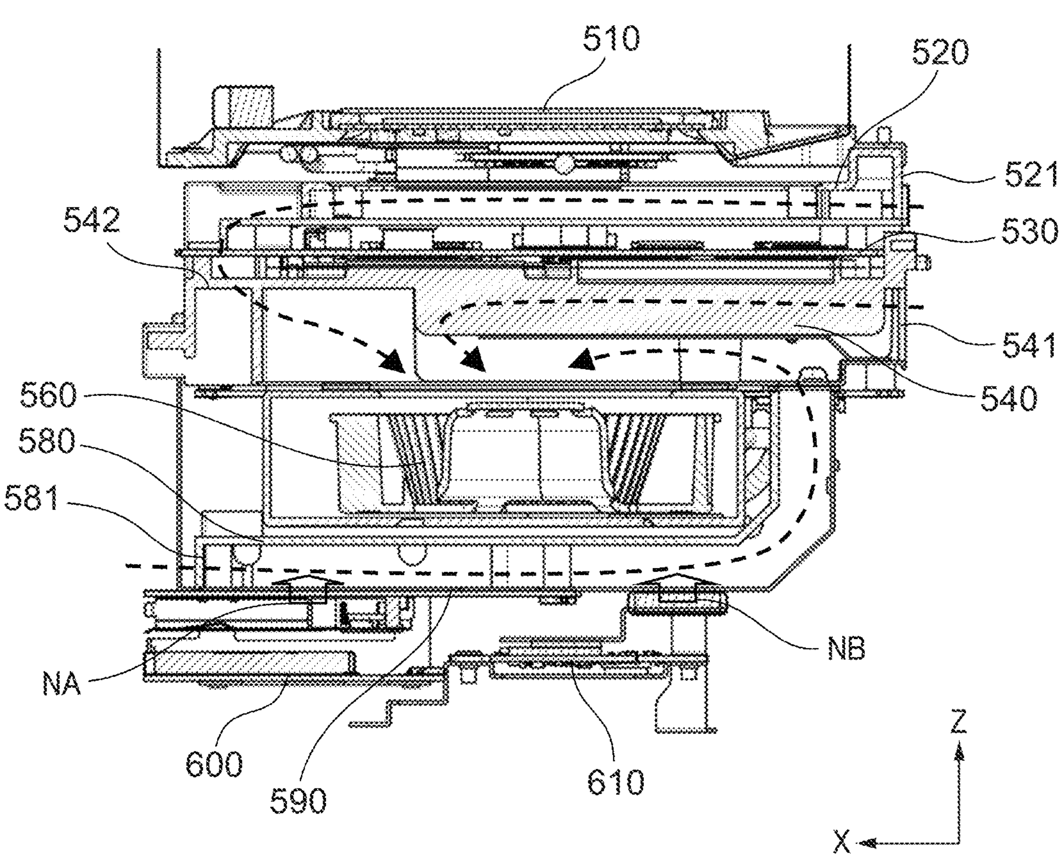

FIG. 9 is a top view of the internal structure 500, FIG. 10A is a rear view of the internal structure 500, and FIG. 10B is a sectional view taken along the line XB-XB in FIG. 10A.

The image pickup apparatus 100 dissipates heat from various heat sources of the image pickup apparatus 100 through forced air cooling with a heat dissipation duct and the blower 560. The heat dissipation duct includes the sensor duct unit 520, the main duct unit 540, the media duct unit 580, and the exhaust duct unit 570. The sensor duct unit 520 takes in outside air from a sensor duct intake port 521, and the taken outside air flows into the main duct unit 540 through a sensor duct connection part 542. The media duct unit 580 takes in outside air from a media duct intake port 581, and the taken outside air flows into the main duct unit 540 through a media duct connection part 543 (see FIG. 8).

The main duct unit 540 takes in outside air from the main duct intake port 541, and the taken outside air flows to a blower connection part 544 (see FIG. 8). The blower 560 is configured to take in air from the blower connection part 544 of the main duct unit 540 and exhaust the air to the outside of the image pickup apparatus 100 via the exhaust duct unit 570. The flow paths with the forced air cooling of the image pickup apparatus 100 described above are indicated by the broken lines in FIGS. 9 and 10B.

The heat generated in the image pickup element 510 is transferred to the sensor duct unit 520 via a heat conductive member such as a graphite sheet (which is not illustrated). The heat generated on the +Z side surface of the control circuit board 530 is transferred to the sensor duct unit 520 via a heat conductive member such as a heat dissipation rubber (which is not illustrated). The heat generated on the −Z side surface of the control circuit board 530 is transferred to the main duct unit 540 via a heat conductive member such as a heat dissipation rubber (which is not illustrated). The heat generated in the power supply board 550 illustrated in FIG. 8 is transferred to the main duct unit 540 via a heat conductive member such as a heat dissipation rubber (which is not illustrated).

The media board 590 is attached into an opening 582 (see FIG. 8) formed in a central part of the media duct unit 580, and thus is partially exposed within the media duct unit 580. Because the air flowing in the media duct unit 580 directly touches the media board 590, the dissipation of heat from the media substrate 590 itself promotes the dissipation of heat from a recording medium mounted onto the media board 590. As a result, it is possible to efficiently dissipate the heat from the recording medium and thus to stably store images on the recording medium despite the increase in power consumption of recording media in order to handle high bit rate data due to the recent trend towards higher resolution images.

The sub-media board 600 is arranged on the rear side (−Z side) of the media board 590 and substantially parallel to the media board 590. As described above, the sub-media board 600 is mounted with a storage device for storing image data having a small capacity, so the sub-media board 600 generates a small amount of heat and can dissipate heat without forced air cooling. The wireless board 610 is substantially flush with (located on the substantially same plane or level as) the sub-media board 600 and is located on the −X side (left side) of the sub-media board 600. The heat generated in the wireless control IC mounted on the wireless board 610 is transferred to the media duct unit 580 via a heat conduction member (which is not illustrated).

The wireless control IC mounted on the wireless board 610 has a lower guaranteed temperature than other heat sources (image pickup element 510, control circuit board 530, power supply board 550, media board 590, and the like) in the image pickup apparatus 100. Thus, the wireless control IC is not mounted on the control circuit board 530 but on the wireless board 610 independent of other heat sources in the present embodiment, whereby the wireless control IC is not affected by other heat sources having high power consumption, and a sufficient heat dissipation effect is ensured.

It should be noted that, in the flow paths of the media duct unit 580, the heat dissipation position (see NA in FIGS. 9 and 10B) for the media board 590 is located on the upstream side of (closer to the media duct intake port 581 than) the heat dissipation position (see NB in FIG. 10B) for the wireless board 610. That is, the media duct unit 580 (heat dissipation duct) includes the media duct intake port 581, and the wireless board 610 is thermally connected to the media duct unit 580 (heat dissipation duct) via a heat conduction member at a position farther from the media duct intake port 581 than the media board 590.

In general, the recording medium mounted on the media board 590 has higher power consumption than the wireless control IC mounted on the wireless board 610, so that the media board 590 has a larger required heat dissipation amount than the wireless board 610. Thus, in consideration of the relative heat dissipation positions for the media board 590 and the wireless board 610 and the relative magnitudes of their power consumption, the heat dissipation duct is configured so that the media board 590, which is closer to the media duct intake port 581, can exchange heat with cold air, thereby achieving efficient heat dissipation.

The wireless board 610 is arranged between the media duct unit 580 and the wireless antenna 110 in the optical axis direction (Z direction). This makes it possible to reduce the distance between the wireless board 610 and the wireless antenna 110 while ensuring the heat dissipation from the wireless board 610. In general, wireless signals are weak and easily affected by electrical noise, so the wire 112 that electrically connects the wireless circuit board 610 and the wireless antenna 110 is made short to reduce the influence of noise and stabilize its wireless characteristics. The reason why the wire 112 is allowed to be shortened is because the distance between the wireless board 610 and the wireless antenna 110 is shortened.

In this manner, the wireless board 610 is parallel to the media duct unit 580 serving as a heat dissipation duct, is arranged between the media duct unit 580 and the wireless antenna 110, and is thermally connected to the media duct unit 580. Thus, the wire 112 can be shortened, and the heat generated in the wireless board 610 is efficiently dissipated.

With the heat dissipation structure of the image pickup apparatus 100 described above, the heat from the various heat sources in the image pickup apparatus 100 is transferred to the respective heat dissipation ducts at positions facing and adjacent to the corresponding heat sources, and heat exchange with the air is carried out through the above-described flow path configuration. This makes it possible to efficiently dissipate the heat from each heat source outside of the image pickup apparatus 100.

Figure 11:
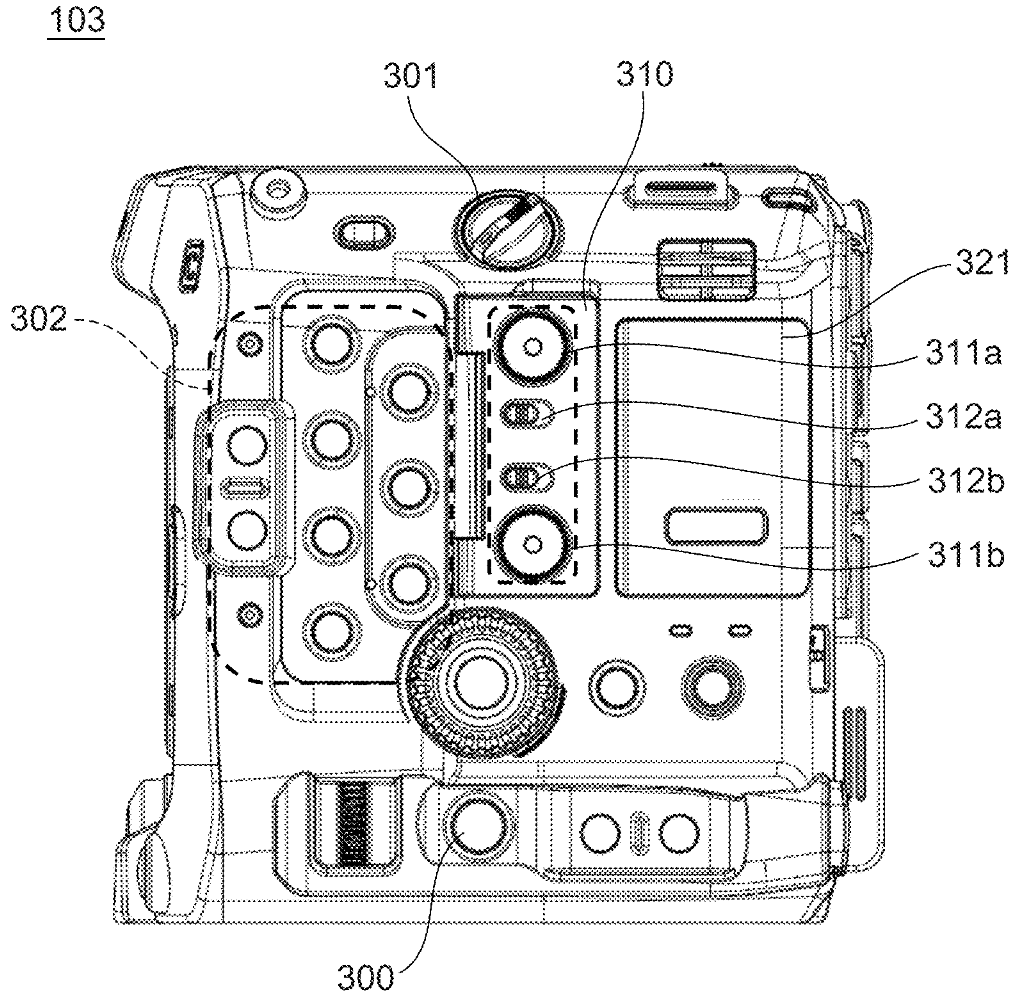
FIG. 11 is a right side view of the image pickup apparatus 100.

FIG. 11 is a right side view of the image pickup apparatus 100. The right side surface 103 of the image pickup apparatus 100 is provided with a main body operation part that allows a user to operate the image pickup apparatus 100 to execute a predetermined operation. The main body operation part includes a REC button 300 for recording a picked up image, a power switch 301 for turning on and off the power, and a main body operation button group 302 for performing various operations such as designation of an image pickup mode. The right side surface 103 of the image pickup apparatus 100 is also provided with a recording medium storage lid 321 for openably closing an opening formed in the image pickup apparatus 100 for attaching and detaching a recording medium.

The right side surface 103 of the image pickup apparatus 100 is also provided with an audio operation system storage lid 310 which is adjacent to the recording medium storage lid 321 and can be opened and closed. When the audio operation system storage lid 310 is in an open position, audio operation dials 311*a* and 311*b* and audio operation switches 312*a* and 312*b* become operable. The audio operation dials 311*a* and 311*b* are dials for a user to operate the audio system, and the audio operation switches 312*a* and 312*b* are switches for a user to operate the audio system. Examples of the audio system operation include, but are not limited to, mute, volume adjustment, and balance operation of left and right stereo sound.

When a user performs basic operations of the image pickup apparatus 100 such as power on/off, various setting operations, recording, and media card insertion and removal, the user typically stands on the right side of the image pickup apparatus 100. When a user puts the image pickup apparatus 100 on the right shoulder and picks up images, the right side of the user's face and the right side surface 103 of the image pickup apparatus 100 face each other. Thus, by arranging the main body operation part which is the operation system of the image pickup apparatus 100, the recording medium, the audio operation dials 311*a* and 311*b*, and the audio operation switches 312*a* and 312*b* on the right side surface 103 of the image pickup apparatus 100, this allows users to perform almost all operations can be performed from the right side, and improves the operability for users.

Figure 12A:
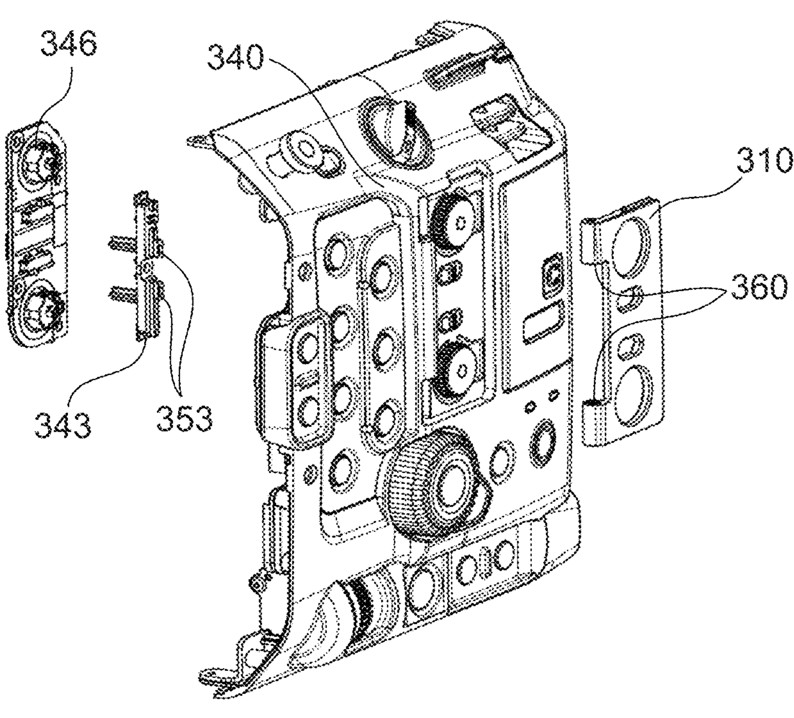
FIGS. 12A and 12B are exploded perspective views of an audio operation system storage lid 310 and a mounting board 346 on a right side surface 103.
Figure 12B:
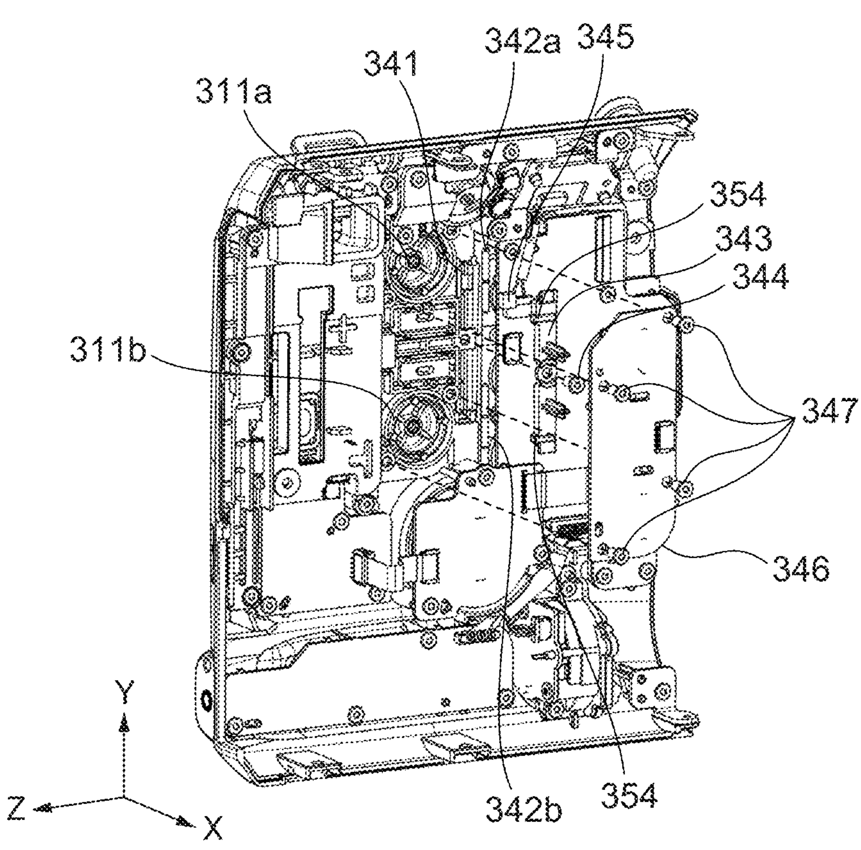

Next, a configuration of the audio operation system storage lid 310 will be described with reference to FIGS. 12A and 12B. FIGS. 12A and 12B are exploded perspective views of the audio operation system storage lid 310 and the mounting board 346 on the right side surface 103 of the image pickup apparatus 100. A configuration including the audio operation system storage lid 310 will be described below by describing how to assembly the configuration. While the audio operation system storage lid 310 is attached to a right exterior cover 340, a rotary shaft 342*a* and a rotary shaft 342*b* is inserted into a shaft groove 341 inside the right exterior cover 340 illustrated in FIG. 12B. The rotary shaft 342*a* is located above (in +Y direction) the rotary shaft 342*b*. The rotary shaft 342*a* and rotary shaft 342*b* inserted into the shaft groove 341 are further inserted and fitted into respective shaft holes 360 formed on the front side (+Z side) of the audio operation system storage lid 310.

Next, while an axial projection 353 formed on a pressing component 343 is fitted in the shaft groove 341, the axial projection 353 is fixed by one screw 344 in the Y-axis direction between the audio operation dial 311*a* and the audio operation dial 311*b*. An elastic member 345 is compressed and sandwiched between the rotary shaft 342*a* and the pressing component 343. The pressing component 343 may deform in the "+X" direction by a reaction force due to the compression of the elastic member 345. Next, a configuration for suppressing this deformation will be described.

Figure 13A:
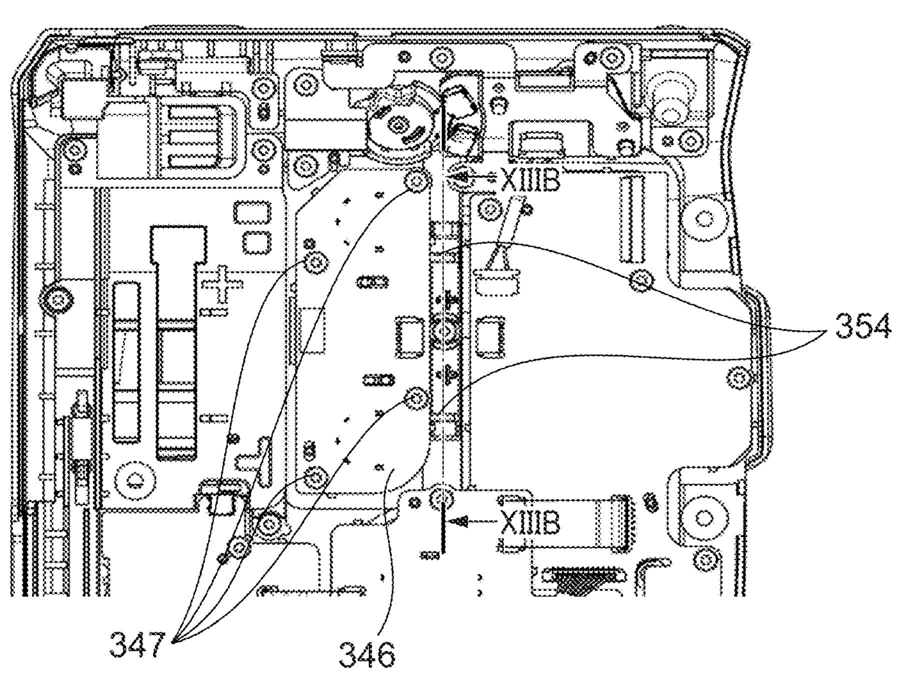
FIGS. 13A and 13B are a configuration diagram and a sectional view of the vicinity of the audio operation system storage lid 310.
Figure 13B:
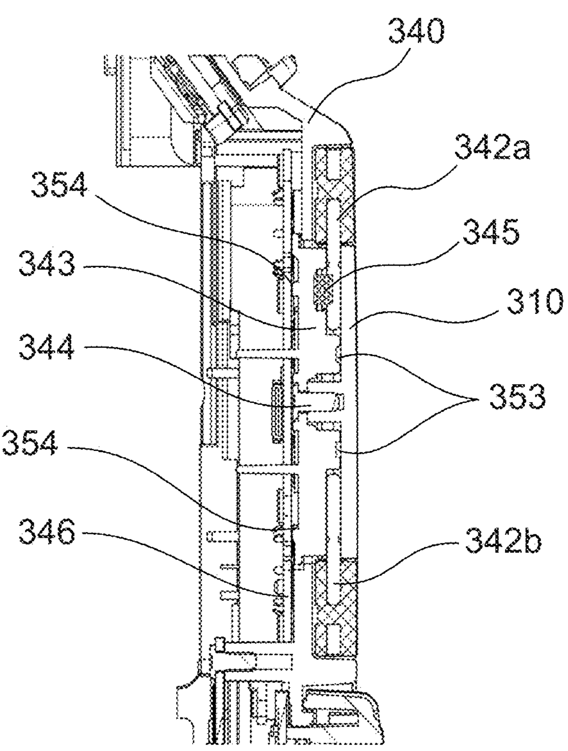

FIG. 13A is an explanatory diagram of a configuration in the vicinity of the audio operation system storage lid 310, and FIG. 13B is a sectional view taken along the line XIIIB-XIIIB (see FIG. 13A) corresponding to the rotary axis position of the audio operation system storage lid 310. As illustrated in FIGS. 13A and 13B, the pair of upper and lower protrusions 354 of the pressing component 343 and the mounting board 346, which are in contact with each other, are fixed to the right exterior cover 340 with four pressing member fixing screws 347.

With such a configuration, the elastic member 345 is reliably compressed by the pressing component 343 and the rotary shaft 342*a*, and this ensures that the rotary shaft 342*a* is biased toward the audio operation system storage lid 310. As a result, it is possible to prevent the occurrence of sound or the like formed by the audio operation system storage lid 310 moving by its own weight and colliding with the right exterior cover 340.

Figure 14A:
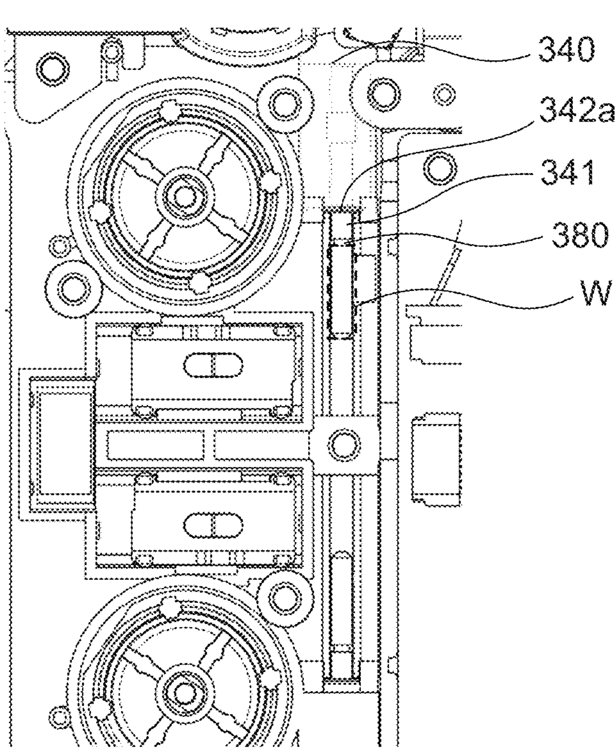
FIGS. 14A and 14B are explanatory diagrams of a cutout 380 formed in a rotary shaft 342*a*.
Figure 14B:
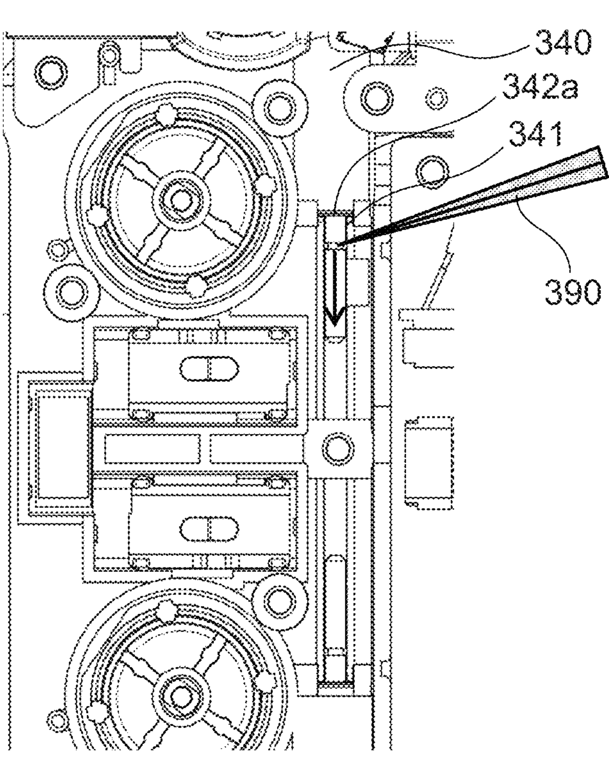

FIGS. 14A and 14B are explanatory diagrams of a cutout 380 formed in a rotary shaft 342*a*, and illustrate a configuration in the vicinity of the shaft groove 341 (see FIG. 12B) with the pressing component 343 and the mounting board 346 in FIGS. 13A, 13B omitted from. As illustrated in FIG. 14A, the cutout 380 is formed substantially at the center of the rotary shaft 342*a*. As described above, the rotary shaft 342*a* is used by being inserted into the shaft groove 341 of the right exterior cover 340 and then into the shaft hole 360 of the audio operation system storage lid 310. In the state where the insertion is made, the cutout 380 does not enter the shaft hole 360 but is exposed as viewed from the inside of the right exterior cover 340, and the rotary shaft 342*a* abuts against the elastic member 345 within a "range W" from the exposed cutout 380 to an end of the rotary shaft 342*a*. As a result, the cutout 380 clarifies the application range of a lubricant for preventing abnormal noise caused by the contact between the elastic member 345 and the rotary shaft 342*a*.

In addition, as illustrated in FIG. 14B, when the audio operation system storage lid 310 is to be replaced because of damage or the like, a tool 390 such as tweezers can be hooked on the cutout 380 of the rotary shaft 342*a*, and the rotary shaft 342*a* can be removed in the direction of the arrow. In this way, the cutout 380 improves reworkability.

As described with reference to FIGS. 11 to 14B, the configuration in the vicinity of the audio operation system storage lid 310 is as follows. The audio operation system storage lid 310 is provided on the right side of the image pickup apparatus 100 so as to be openable and closable as viewed from the front of the image pickup apparatus 100, and as illustrated in FIG. 12B, the image pickup apparatus 100 includes the pressing component 343 that prevents the pair of upper and lower rotary shafts 342*a* and 342*b* inserted into the audio operation system storage lid 310 from coming off. Further, the image pickup apparatus 100 includes the elastic member 345 compressed between the pressing component 343 and the rotary shafts 342*a* and 342*b*, and the mounting board 346 (see FIGS. 13A and 13B) located at a position overlapping with the audio operation system storage lid 310 as viewed from the right side of the image pickup apparatus 100. The pressing component 343 is fixed at one point to the right exterior cover 340 (see FIG. 12B) forming the housing of the image pickup apparatus 100, and the protrusions 354 and 354 provided on both sides of the part where the pressing component 343 is fixed to the right exterior cover 340 are located between the mounting board 346 and the right exterior cover 340. As described above, such a configuration can prevent the occurrence of abnormal noise or the like that occurs when the audio operation system storage lid 310 freely moves and collides with the right exterior cover 340.

More specifically, the pressing component 343 is fixed by the pair of upper and lower audio operation dials 311*a* and 311*b*, and the audio operation system storage lid 310 can be opened and closed to expose the pair of upper and lower audio operation dials 311*a* and 311*b*. The pressing component 343 is biased by the compressed elastic member 345, and the protrusion 354 of the biased pressing component 343 abuts against and is fixed to the mounting board 346. As illustrated in FIG. 14A, the upper rotary shaft 342*a* includes the cutout 380, and one end portion of the rotary shaft 342*a* is fitted into the shaft hole 360 (see FIG. 12A) provided in the audio operation system storage lid 310 while the cutout 380 is exposed. On the other end portion, the elastic member 345 abuts against an area between the cutout 380 and the other end of the rotary shaft 342*a*. As described above, this configuration makes it possible to pull out the rotation shaft 342*a* by hooking the tool 390 (see FIG. 14B) on the cutout 380 of the rotary shaft 342*a*, when the audio operation system storage lid 310 is replaced.

Figure 15:
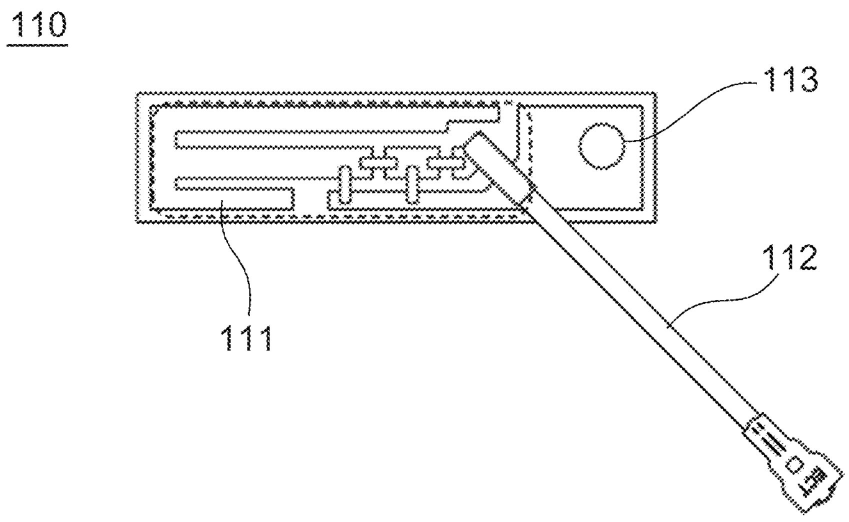
FIG. 15 is an explanatory diagram of a wireless antenna 110.
Figure 16:
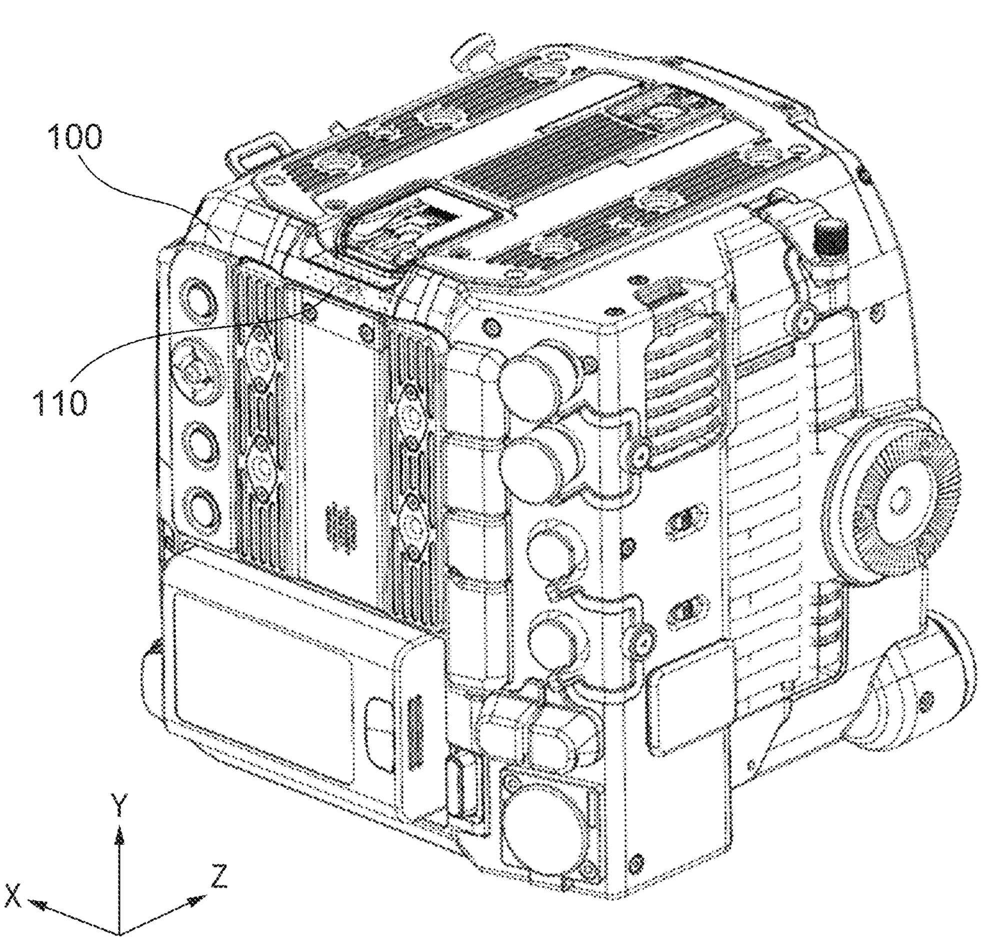
FIG. 16 is a perspective view illustrating an arrangement position of the wireless antenna 110.
Figure 17:
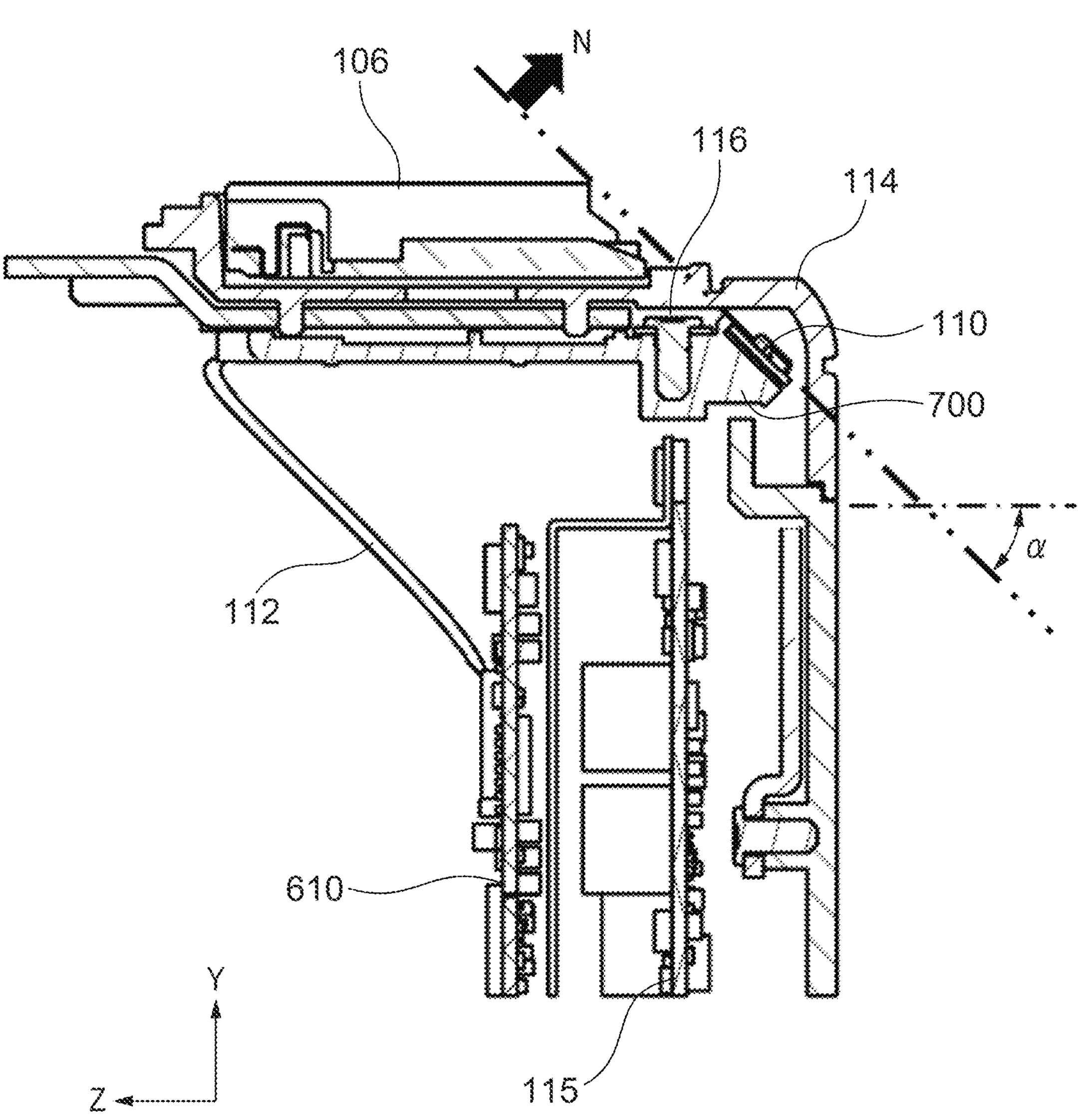
FIG. 17 is a partial sectional view of the image pickup apparatus 100 on a plane that is orthogonal to an X axis and passes through the wireless antenna 110.
Figure 18:
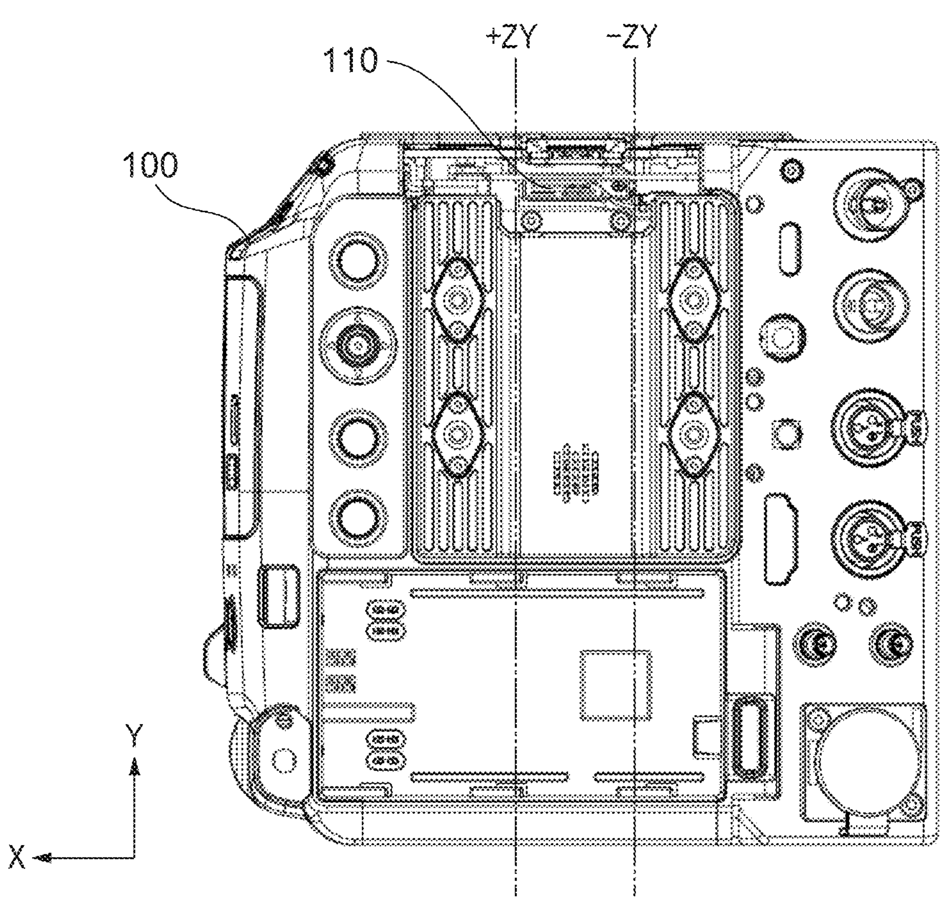
FIG. 18 is a rear view of the image pickup apparatus 100 with a wireless cover 114 removed.
Figure 19:
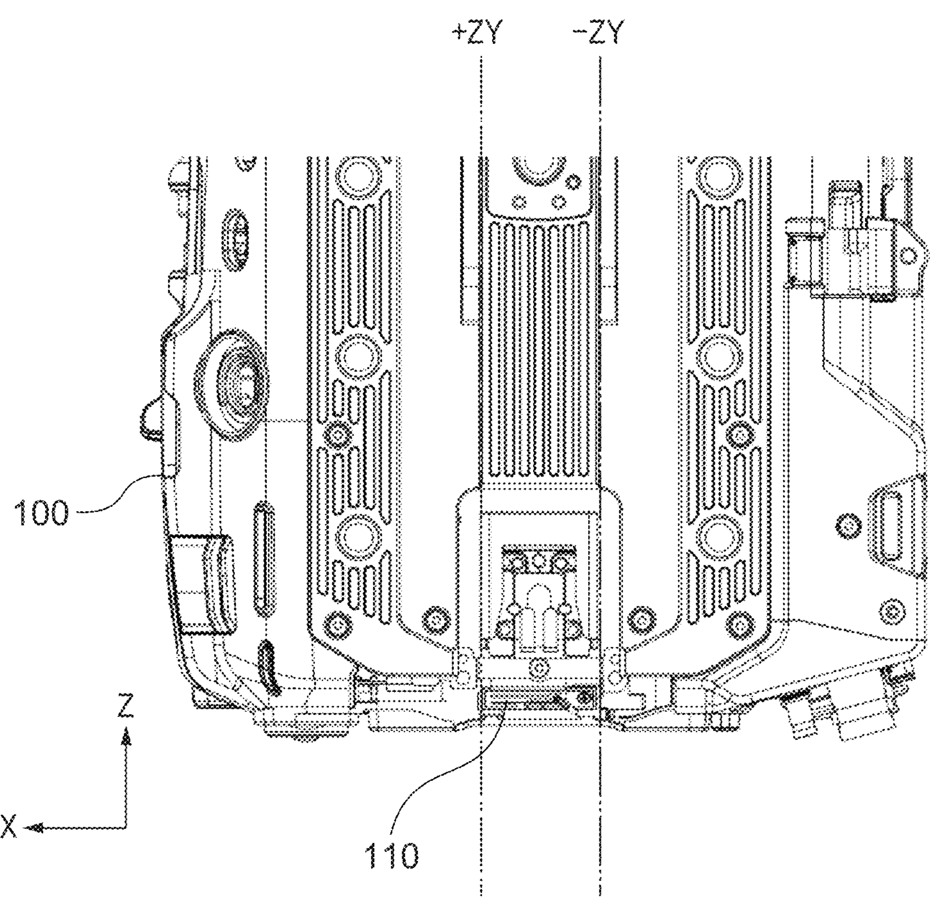
FIG. 19 is a partial top view of the image pickup apparatus 100 with the wireless cover 114 removed.
Figure 20:
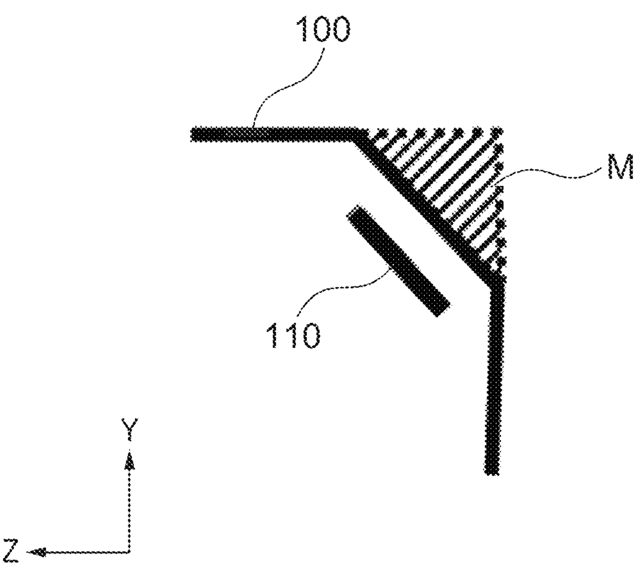
FIG. 20 is a schematic explanatory diagram illustrating an arrangement position of the wireless antenna 110.
Figure 21:
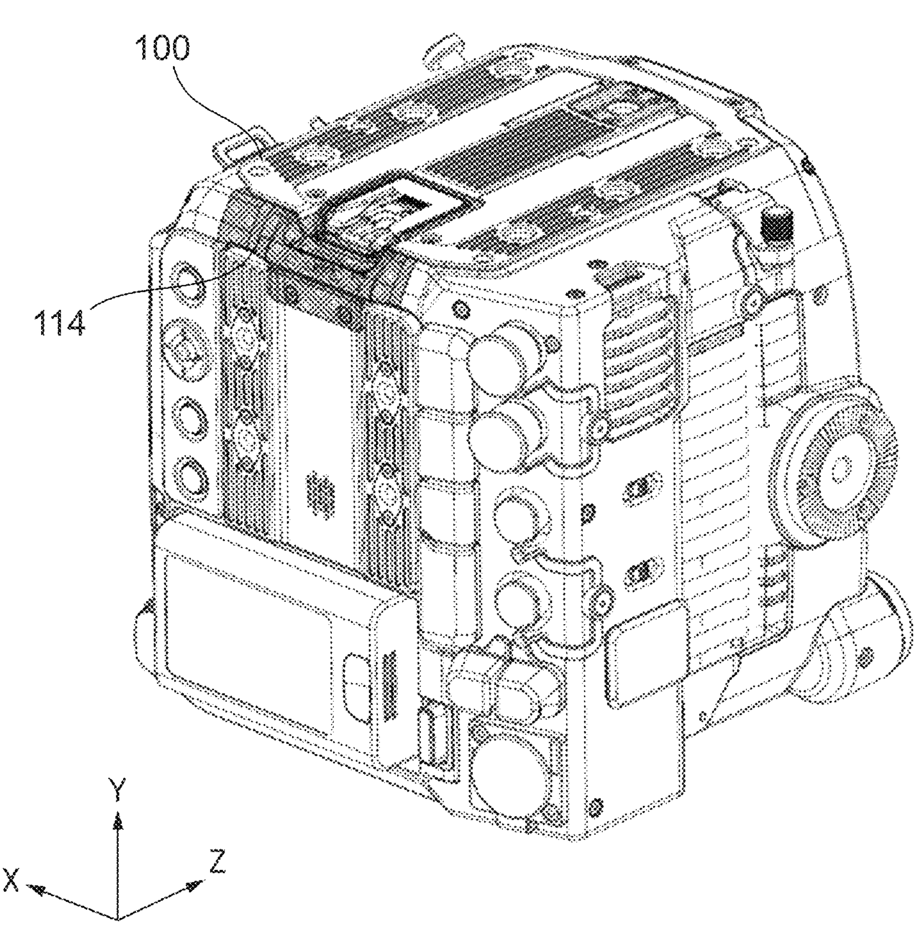
FIG. 21 is a perspective view of the image pickup apparatus 100 for illustrating the wireless cover 114.
Figure 22:
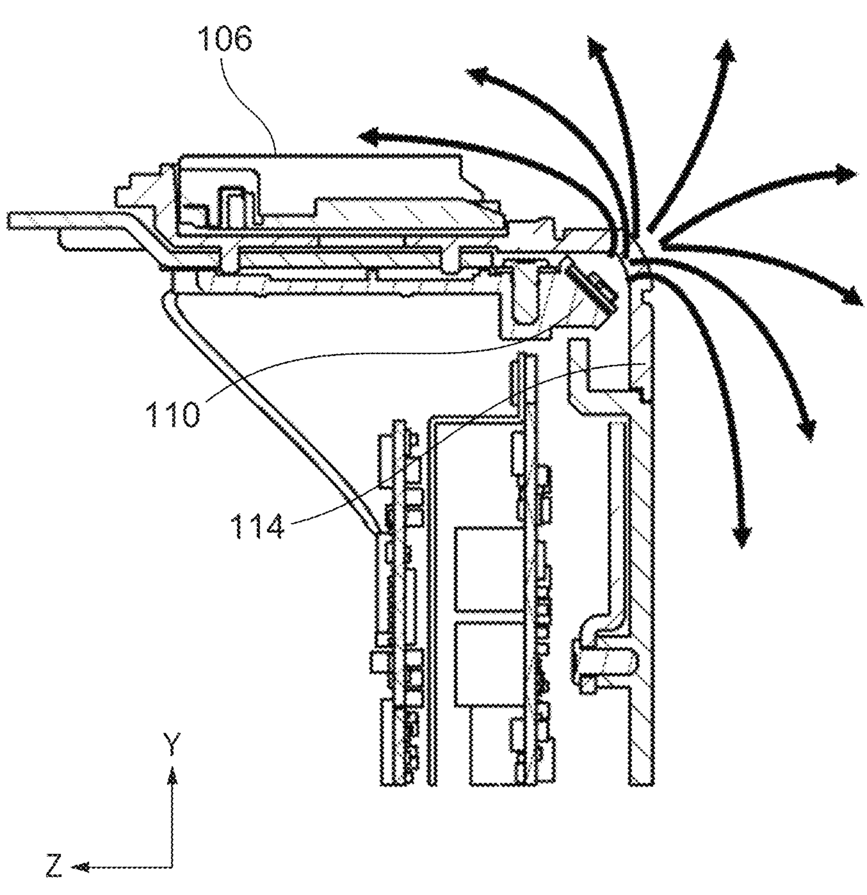
FIG. 22 is a schematic explanatory diagram illustrating radio waves emitted from the wireless antenna 110.
Figure 23:
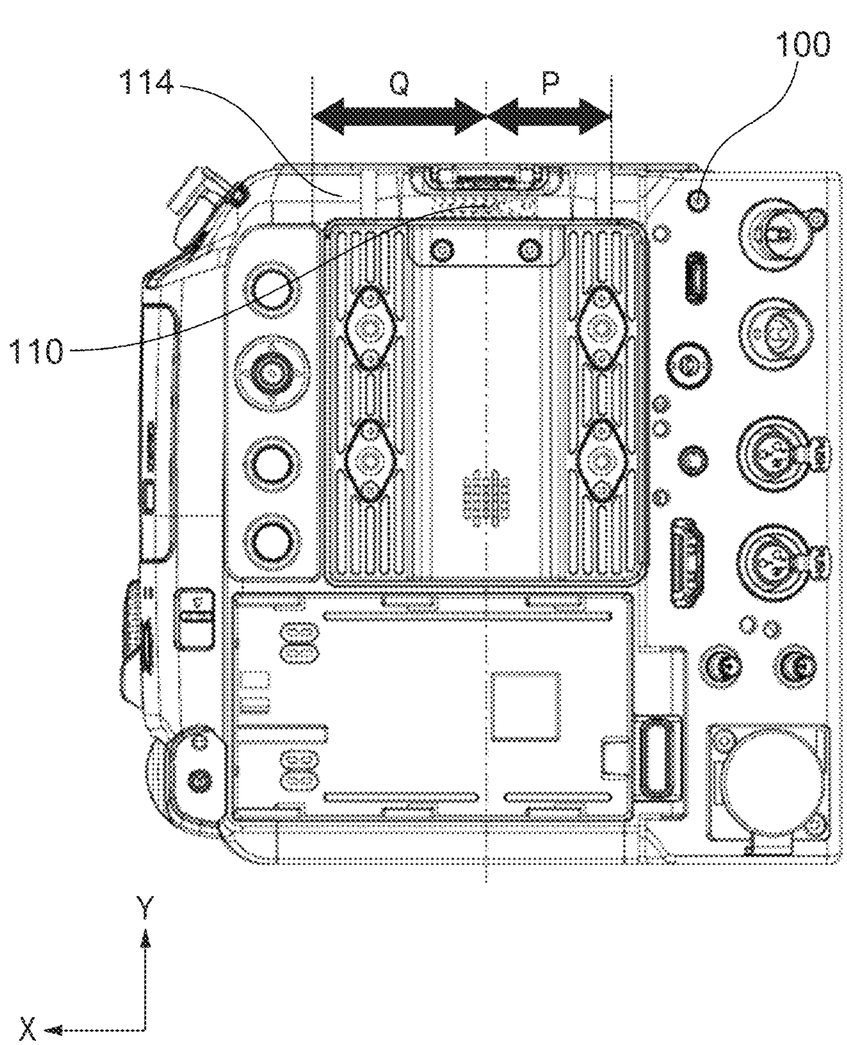
FIG. 23 is a rear view of the image pickup apparatus 100 for illustrating the wireless cover 114.

Next, the wireless antenna 110 will be described with reference to FIGS. 15 to 23. FIG. 15 is an explanatory diagram of the wireless antenna 110, FIG. 16 is a perspective view illustrating an arrangement position of the wireless antenna 110, FIG. 17 is a partial sectional view of the image pickup apparatus 100 on a plane that is orthogonal to the X axis and passes through the wireless antenna 110, and FIG. 18 is a rear view of the image pickup apparatus 100 with the wireless cover 114 removed. FIG. 19 is a partial top view of the image pickup apparatus 100 with the wireless cover 114 removed, FIG. 20 is a schematic explanatory diagram illustrating the arrangement position of the wireless antenna 110, and FIG. 21 is a perspective view of the image pickup apparatus 100 for illustrating the wireless cover 114. FIG. 22 is an explanatory diagram illustrating radio waves emitted from the wireless antenna 110, and FIG. 23 is a rear view of the image pickup apparatus 100 for illustrating the wireless cover 114.

As illustrated in FIG. 15, the wireless antenna 110 is formed in a horizontal rectangular shape. An antenna pattern 111 is formed in a planar shape, and is located close to one of the short sides of the rectangular wireless antenna 110. The antenna pattern 111 of the wireless antenna 110 functions as an antenna that transmits and receives wireless signals. Further, the wireless antenna 110 includes a wire 112 for electrically connecting to the wireless board 610 (see FIG. 7), and a fixing part 113 for fixing the wire 112. The antenna pattern 111, the wire 112, and the fixing part 113 are located in the wireless antenna 110 so as to entirely divide the wireless antenna 110 into two portions in the longitudinal direction. That is, the antenna pattern 111 is formed on one side (one short side) in the longitudinal direction of the wireless antenna 110, and the wire 112 and the fixing part 113 are provided on the other side (the other short side). Specifically, the fixing part 113 is provided at the right end of the wireless antenna 110 in FIG. 15. It should be noted that the antenna pattern 111 of the wireless antenna 110 can be produced, for example, by forming a conductor constituting a power feeding point, a radiation device, or the like on a dielectric board stacked on a ground conductor plate, but the wireless antenna 110 is not limited to such antennas.

As illustrated in FIGS. 16 and 17, the wireless antenna 110 is arranged on the inside of a ridge formed by two surfaces of the rear surface and the upper surface of the housing of the image pickup apparatus 100, where the housing is formed of a conductive member. The wire 112 of the wireless antenna 110 is fixed using the fixing part 113 while being electrically connected to the wireless board 610. As illustrated in FIG. 17, the wireless antenna 110 is fixed inside the image pickup apparatus 100, in a position inclined by a predetermined angle "α" around the X axis with respect to the image pickup apparatus 100 (specifically, the housing of the image pickup apparatus 100), with the antenna pattern 111 facing both the upper surface and the rear surface of the image pickup apparatus 100. More specifically, the wireless antenna 110 is arranged inside the image pickup apparatus 100, facing the wireless cover 114 at a predetermined angle (acute angle) with respect to the upper surface of the housing (or a plane parallel to the upper surface of the housing of the image pickup apparatus 100, indicated by a one-dot chain line in FIG. 17) around the axis extending in the width direction of the image pickup apparatus 100. The wireless antenna 110 is fixed to an appropriate member inside the image pickup apparatus 100 with the front surface on which the antenna pattern 111 is formed facing upward.

Next, how the wireless antenna 110 is fixed will be described. The wireless antenna 110 is fixed to an appropriate member inside the image pickup apparatus 100 with the front surface on which the antenna pattern 111 is formed facing upward. For example, the wireless antenna 110 is fixed to a fixing member 700 in FIG. 17. The fixing member 700 is a member attached to the top of the housing in parallel with the upper surface of the housing, and the upper surface of an end of the fixing member 700 in the "−Z direction" is inclined. The wireless antenna 110 is fixed to the inclined upper surface (fixing surface) of the end of the fixing member 700. The manner of fixing the wireless antenna 110 to the fixing member 700 is screwing, bonding, or the like, but is not limited to these. The fixing member 700 is fixed in a position such that the wireless antenna 110 faces the wireless cover 114 when the wireless antenna 110 is fixed to the fixing member 700. The fixing member 700 (in particular, the fixing surface) has a predetermined angle with respect to the upper surface and the rear surface of the housing as viewed from the "X+" direction. Specifically, the fixing member 700 (fixing surface) and the upper surface of the housing form an acute angle α measured clockwise from the upper surface of the housing, and the fixing member 700 and the rear surface of the housing form an obtuse angle of (90+α) degrees measured clockwise from the rear surface (Y direction) of the housing. The member for fixing the wireless antenna 110 is not limited to the fixing member 700.

That is, as long as the wireless antenna 110 is fixed in the position facing the wireless cover 114 as a whole (in FIG. 17, the position facing a part of the ridge extending between two surfaces of the upper surface and the rear surface of the housing), the shape, the size, the fixing mode, and the like of the member for fixing the wireless antenna 110 are not particularly limited. It should be noted that, in FIG. 17, the wireless cover 114 is illustrated and described to have a corner part. However, in practice, the corner part may be eliminated, for example, by cutting the corner part of the wireless cover 114 in parallel with the upper surface of the wireless antenna 110 so as to achieve downsizing of the apparatus. Here, being parallel to the upper surface of the wireless antenna 110 means being parallel to the downward-sloping dashed-two dotted line in the upper right of FIG. 17.

By arranging the wireless antenna 110 in the inclined position with facing the ridge as described above, the exterior surface (housing surface) of the image pickup apparatus 100 can be formed to extend along the wireless antenna 110 as illustrated in FIG. 20. Thus, as described above, in FIG. 17, the wireless cover 114 is illustrated to have a corner part, but a design in which the corner part of the apparatus is removed can be adopted. Specifically, as illustrated in FIG. 20, a triangular area M can be cut off from the corner part of the exterior member in a side view of the image pickup apparatus 100, and this downsizes the image pickup apparatus 100. It should be noted that the area M illustrated in FIG. 20 actually has a three-dimensional triangular prism shape.

As illustrated in FIGS. 17 and 21, the wireless cover 114 constitutes an exterior surface of the image pickup apparatus 100 while covering the front side (the surface on which the antenna pattern 111 is positioned) of the wireless antenna 110. The exterior member of the image pickup apparatus 100 is mainly formed of a conductive resin material into which a conductive filler such as carbon or metal is kneaded. On the other hand, the wireless cover 114 is formed of a non-conductive resin material. That is, the image pickup apparatus 100 includes the rectangular wireless antenna 110 in a horizontal rectangular shape (which has a rectangular shape and extends in the width direction of the image pickup apparatus 100) with the planar antenna pattern 111, and a substantially hexahedral (substantially cubic shape, substantially rectangular parallelepiped shape, or the like) housing composed of a conductive member. The wireless cover 114 is formed of a non-conductive member and forms a part of the ridge extending between the two surfaces of the rear surface and the upper surface of the housing of the image pickup apparatus 100. Non-conductive materials, such as resin materials, do not affect the radio wave performance, and thus the non-conductive wireless cover 114 covering the front side of the wireless antenna 110 does not cause any wireless transmission loss, thereby almost eliminating the influence on the wireless performance.

In FIGS. 18 and 19, the +ZY plane indicates a plane passing through the +X side end of the wireless antenna 110, and the −ZY plane indicates a plane passing through the −X side end of the wireless antenna 110. Here, the +ZY plane and the −ZY plane respectively include the ends in the longitudinal direction of the wireless antenna 110, and they are both parallel to the optical axis direction of the image pickup apparatus 100. In the image pickup apparatus 100, any conductive member made of a metal material, a conductive resin material, or the like is not located in a region sandwiched between the +ZY and −ZY planes and above a plane including the antenna pattern 111 of the wireless antenna 110 (see the arrow N in FIG. 17).

The image pickup apparatus 100 has a plurality of functions in addition to the wireless function, and thus includes the board 115 mounted with a circuit for realizing the functions and a plurality of internal component fixing screws 116 for fixing various components. However, as illustrated in FIG. 17, all of these are located inside the image pickup apparatus 100 further than the wireless antenna 110 (antenna pattern 111).

By adopting such a configuration, the radio waves are emitted from the antenna pattern 111 to the outside of the image pickup apparatus 100 in various directions without being obstructed as indicated by the arrows in FIG. 22. This makes it possible for the image pickup apparatus 100 to communicate with a farther electronic device with radio waves.

In addition, as described above, the wireless antenna 110 is located on the rear side in the image pickup apparatus 100. When image data picked up at an actual image pickup location is transmitted to a receiving device on a reception location using the wireless antenna 110, it is common that the receiving device is not installed on the subject side of the image pickup apparatus 100, but is installed on the rear of the image pickup apparatus 100 where a user is present. Thus, it is possible to more reliably perform wireless communication when the wireless antenna 110 is located on the rear side in the image pickup apparatus 100. Therefore, it is preferable to arrange the wireless antenna 110 on the rear side as in the image pickup apparatus 100 of the present embodiment.

In addition, to propagate wireless radio waves farther, it is more efficient to emit wireless radio waves above the image pickup apparatus 100. Thus, it is preferable to arrange the wireless antenna 110 on the upper side in the image pickup apparatus 100 as in the present embodiment. Further, as illustrated in FIGS. 15 and 18, the antenna pattern 111 is located close to one side in the wireless antenna 110. The radio waves emitted from the antenna pattern 111 can be attenuated by being affected by the wire 112, the fixing part 113, and the like in the vicinity. Thus, the intensity of the radio waves emitted from the antenna pattern 111 does not uniformly spread, but becomes weak on the side where the wire 112 is present and strong on the opposite side where the wire is not present. Thus, as can be seen with reference to FIGS. 15 and 18, the wireless antenna 110 of the present embodiment is arranged so that the antenna pattern 111 is located on the "+X side".

With reference to FIG. 23, the length of the wireless cover 114 covering the wireless antenna 110 of the present embodiment in the X-axis direction will be described. In FIG. 23, the distance from the center of the wireless antenna 110 in the X-axis direction to the outer edge of the wireless cover 114 on the "−X side" is defined as "P", and the distance to the outer edge of the wireless cover 114 on the "+X side" is defined as "Q". Under this definition, the lengths of the wireless cover 114 in the X-axis direction are set such that "Q>P" is satisfied, and the wireless cover 114 is arranged accordingly.

That is, the wireless cover 114 is arranged such that its length in the X direction satisfies the following condition. The wireless cover 114 is located so that the length in the X direction from the center in the longitudinal direction of the wireless antenna 110 to the end on one side (+X side) of the wireless cover 114 is longer than the length in the X direction from the center in the longitudinal direction of the wireless antenna 110 to the end on the other side (−X side) of the wireless cover 114. In addition, as illustrated in FIGS. 15 and 21, the antenna pattern 111 is located inside the image pickup apparatus 100 with facing a portion on the one side of the wireless cover 114.

The wireless antenna 110 also includes the wire 112 for electrically connecting to the wireless board 610 mounted with the wireless control IC that controls the wireless antenna 110, and the wire 112 faces a portion on the other side of the wireless cover 114. With such a configuration, there are fewer objects shielding the radio waves in an area where the intensity of the radio waves is strong, and the radio performance becomes very efficient.

As described above, the wireless performance of the wireless antenna 110 can be ensured while downsizing the image pickup apparatus 100 by arranging the wireless antenna 110 as described in the present embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-021149, filed Feb. 15, 2024, which is hereby incorporated by reference wherein in its entirety.

What is claimed is:

1. An image pickup apparatus comprising:

a wireless antenna in a rectangular shape, extending in the width direction of the image pickup apparatus, the wireless antenna comprising an antenna pattern in a planar shape;

a housing in a substantially hexahedral shape, comprising a conductive member; and a wireless cover that forms a part of a ridge extending between a rear surface and an upper surface of the housing, the wireless cover being formed of a non-conductive member, wherein the wireless antenna is arranged inside the image pickup apparatus, facing the wireless cover at a predetermined angle with respect to the housing around an axis extending in the width direction of the image pickup apparatus.

2. The image pickup apparatus according to claim 1, wherein no conductive member included in the housing is present in a region above a plane including the antenna pattern of the wireless antenna, the region being sandwiched between two planes both parallel to an optical axis direction of the image pickup apparatus, the two planes respectively including ends in a longitudinal direction of the wireless antenna.

3. The image pickup apparatus according to claim 1, wherein the antenna pattern is located close to one of short sides of the wireless antenna in the rectangular shape.

4. The image pickup apparatus according to claim 3, wherein the wireless cover is located so that a length in the width direction of the image pickup apparatus from a center in a longitudinal direction of the wireless antenna to an end on one side of the wireless cover is longer than a length in the width direction of the image pickup apparatus from the center in the longitudinal direction to an end on an other side of the wireless cover.

5. The image pickup apparatus according to claim 4, wherein the antenna pattern of the wireless antenna is located inside the image pickup apparatus while facing a portion on the one side of the wireless cover.

6. The image pickup apparatus according to claim 5, wherein the wireless antenna comprises a wire for electrically connecting to a wireless board on which a wireless control IC that controls the wireless antenna is mounted, the wire facing a portion on the other side of the wireless cover.

7. The image pickup apparatus according to claim 6, wherein the wireless antenna further comprises a fixing part for fixing the wire.

8. The image pickup apparatus according to claim 7, wherein the fixing part is arranged close to the other of the short sides of the wireless antenna in the rectangular shape.

9. The image pickup apparatus according to claim 1, wherein the wireless antenna is arranged inside the image pickup apparatus, facing the wireless cover at an acute angle with respect to the upper surface of the housing around the axis extending in the width direction of the image pickup apparatus.

10. The image pickup apparatus according to claim 1, further comprising:

a wireless board on which a wireless control IC that controls the wireless antenna is mounted; and a heat dissipation duct configured to dissipate heat, wherein the wireless board is parallel to the heat dissipation duct, is arranged between the heat dissipation duct and the wireless antenna, and is thermally connected to the heat dissipation duct.

11. The image pickup apparatus according to claim 10, further comprising a media board on which a recording medium that records image information is to be mounted in a dismountable manner, wherein the heat dissipation duct comprises an intake port through which outside air is taken in, and the wireless board is thermally connected to the heat dissipation duct via a heat conduction member at a position farther from the intake port than the media board.

12. The image pickup apparatus according to claim 11, further comprising a sub-media board on which a storage device having a capacity smaller than that of the recording medium is to be mounted, the sub-media board being arranged substantially in parallel with the media board, wherein the wireless board is substantially flush with the sub-media board.

* * * * *